US007414751B2

(12) United States Patent
Yamazaki et al.

(10) Patent No.: US 7,414,751 B2
(45) Date of Patent: Aug. 19, 2008

(54) PRINTER, PRINT CONTROL PROGRAM, MEDIUM HAVING PRINT CONTROL PROGRAM RECORDED THEREIN, AND PRINTING METHOD

(75) Inventors: Satoshi Yamazaki, Nagano-ken (JP); Yoshifumi Arai, Nagano-ken (JP); Shuichi Kataoka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 857 days.

(21) Appl. No.: 10/339,858

(22) Filed: Jan. 9, 2003

(65) Prior Publication Data

US 2003/0151756 A1 Aug. 14, 2003

(30) Foreign Application Priority Data

Jan. 11, 2002 (JP) ............................. 2002-004816

(51) Int. Cl.
G06F 15/00 (2006.01)
G06K 1/00 (2006.01)
H04N 1/60 (2006.01)

(52) U.S. Cl. ..................... 358/1.9; 358/1.4; 358/518
(58) Field of Classification Search ................ 358/1.9, 358/518, 1.4
See application file for complete search history.

(56) References Cited

U.S. PATENT DOCUMENTS

| 6,062,137 | A  | * | 5/2000  | Guo et al. ................. 101/171 |
| 6,152,999 | A  | * | 11/2000 | Erdtmann et al. .......... 106/31.6 |
| 6,211,970 | B1 | * | 4/2001  | Cornell et al. ............. 358/1.9 |
| 6,322,192 | B1 | * | 11/2001 | Walker ........................ 347/19 |
| 6,527,366 | B1 | * | 3/2003  | Byers et al. ................. 347/43 |
| 6,577,395 | B1 | * | 6/2003  | Berns et al. ............... 356/402 |
| 6,593,558 | B1 | * | 7/2003  | Edgar ...................... 250/208.1 |
| 6,655,784 | B2 | * | 12/2003 | Kakutani .................... 347/43 |
| 6,674,562 | B1 | * | 1/2004  | Miles ........................ 359/291 |
| 6,690,471 | B2 | * | 2/2004  | Tandon et al. ............. 356/420 |
| 6,774,988 | B2 | * | 8/2004  | Stam et al. ................ 356/218 |
| 6,997,979 | B2 | * | 2/2006  | Bauer et al. .............. 106/31.6 |
| 7,009,734 | B2 | * | 3/2006  | Suwa et al. ................. 358/1.9 |

(Continued)

FOREIGN PATENT DOCUMENTS

JP  10-044473  2/1998

(Continued)

OTHER PUBLICATIONS

Abstract of Japanese Patent Publication No. 10-044473, Pub. Date: Feb. 17, 1998, Patent Abstracts of Japan.

(Continued)

*Primary Examiner*—Mark Zimmerman
*Assistant Examiner*—Benjamin O Dulaney
(74) *Attorney, Agent, or Firm*—Martine Penilla & Gencarella, LLP

(57) ABSTRACT

Colors look differently when observed under sunlight and room light. At least three chromatic colors and additional chromatic colors differing in hue from said three colors are used in combination. The additional colors are those which have a spectral reflectance which smoothens waviness in the spectral reflectance curve of the nearly achromatic color produced by the combination of the three chromatic colors. As the result, the combination of the colors gives rise to a color which has almost uniform spectral reflectance over the entire region of wavelengths. Thus it is possible to obtain printing which is less vulnerable to change in color under different light sources.

12 Claims, 16 Drawing Sheets

U.S. PATENT DOCUMENTS

2005/0052667 A1 * 3/2005 Yamazaki et al. ............ 358/1.9

FOREIGN PATENT DOCUMENTS

| JP | 2000-334984 | 12/2000 |
| JP | 2001-232825 | 8/2001 |

OTHER PUBLICATIONS

Abstract of Japanese Patent Publication No. 2000-334984, Pub. Date: Dec. 5, 2000, Patent Abstracts of Japan.

Abstract of Japanese Patent Publication No. 2001-232825, Pub. Date: Aug. 28, 2001, Patent Abstracts of Japan.

* cited by examiner

Fig. 4

|  | R | G | B | C | M | Y | K | R | V |
|---|---|---|---|---|---|---|---|---|---|
| Black | 0 | 0 | 0 | 3 | 0 | 0 | 252 | 0 | 3 |
|  | 128 | 128 | 128 | 152 | 0 | 72 | 0 | 160 | 0 |
| White | 255 | 255 | 255 | 0 | 0 | 0 | 0 | 0 | 0 |

PRINTER, PRINT CONTROL PROGRAM, MEDIUM HAVING PRINT CONTROL PROGRAM RECORDED THEREIN, AND PRINTING METHOD

BACKGROUND OF THE INVENTION

1. Field of the Invention

The present invention relates to a printer, a print control program, a medium having print control program recorded therein, and a printing method.

2. Description of the Prior Art

How humans perceive colors from ink attached to printing paper may be explained in terms of the product of three factors—the spectral distribution of the light source, the reflectance of the ink and printing paper, and the color matching function which depends on the characteristic properties of the human eye. Printers usually produce colors by combination of three inks expressing C (cyan), M (magenta), and Y (yellow) [the former two may be replaced by lc (light cyan) and lm (light magenta), respectively, which are similar to them in hue]. This means that the color humans perceive changes as ink changes in its spectral distribution. An adequate combination of colors (C, M, Y) produces an achromatic color (gray) on printing paper.

Printing with a conventional printer needs preliminary steps. First, trial print undergoes colorimetry with a specific light source. Then, a correspondence between ink combination and image data is established on the basis of calorimetric values. Finally, regular printing starts while referencing the correspondence. Since any color is represented by the product of three factors as mentioned above, it is essential that the colorimetry be carried out under a specific light source. If a printed product is observed under a light source which is different from that used for the colorimetry, then it looks differently. This phenomenon occurs remarkably in the case of low chromatic color or achromatic color (gray). For example, an object which takes on gray under the sunlight would look reddish under the room light. Pigment-based ink greatly varies in hue depending on light sources.

SUMMARY OF THE INVENTION

The present invention was completed in view of the foregoing problem. It is an object of the present invention to provide a printer, a print control program, a medium having print control program recorded therein, and a printing method, which are intended to give print results with a minimum of variation in color regardless of light sources used.

The first aspect of the present invention resides in a printer of the type having an ink cartridge mount to carry a plurality of ink cartridges thereon and a printing mechanism for printing on printing paper with inks received from said ink cartridges, wherein said ink cartridge mount is so designed as to carry at least three ink cartridges filled respectively with three chromatic color inks and a secondary ink cartridge filled with a chromatic color ink differing in hue from any of said three chromatic color inks.

The perception of colors involves the spectral distribution of the light source, the reflectance of the ink and printing paper, and the color matching function which depends on the characteristic properties of the human eye, as mentioned above. The color matching function is characteristic of the human eye, and the spectral distribution varies from one light source to another. Therefore, causing ink to vary in spectral reflectance is a suitable way to artificially control how printed colors look under different light sources. The object of controlling the spectral reflectance at will is achieved by combination of the three chromatic color inks with another one in the secondary ink cartridge. Thus, according to the present invention, it is possible to control at will the spectral reflectance and how printed colors look.

Here, the spectral reflectance of ink is characteristic of individual ink types and ink colors. The variation of the spectral reflectance (or the reflectance of light with varied wavelengths) makes colors to look differently. For example, visible light with a wavelength of 630 nm looks red for the human eye. Therefore, any ink looks red if it has a high spectral reflectance at wavelengths in the neighborhood of 630 nm and a low spectral reflectance at other wavelengths. The above-mentioned three chromatic color inks slight differ from one another in spectral reflectance in the visible region, but the chromatic color ink differing in hue from the three chromatic color inks has a higher spectral reflectance at wavelengths differing from those of the three chromatic color inks. Therefore, the ink held in the secondary ink cartridge contributes to the flexible control of spectral reflectance.

A printer can express any arbitrary color so long as it has inks for at least three colors. When these inks are combined with one another, the spectral reflectance of one ink superposes that of the other and the superposed spectral reflectance makes the combined inks to look like another ink having a high value of spectral reflectance. Superposing a chromatic color ink differing in hue from the three chromatic color inks permits more flexible control of the superposed spectral reflectance. The superposed spectral reflectance of ideal achromatic colors is uniform over the entire visible range of wavelengths. However, it is difficult to make uniform the superposed spectral reflectance by the combination of three color inks; it is only possible to make uniform the superposed spectral reflectance by adding to the three color inks another ink differing in hue.

Thus, the above-mentioned ink cartridges should be filled respectively with at least three chromatic color inks, so that any combination of these inks can produce a nearly arbitrary color under a specific light source. A combination of CMY inks or RGB inks is an example. What is essential is that at least three colors should be used and any color with a similar hue may be added to them.

In other words, the above-mentioned CMY inks may be supplemented with lc, lm, and DY (dark yellow) inks. The latter are almost identical in hue with the former. The use of these additional color inks is within the scope of the present invention because they differ in hue from the chromatic color ink held in the secondary ink cartridge. In addition, the present invention can be applied to a large variety of printers, including ink jet printers (which discharge ink droplets) and laser printers (which use a toner ink).

The above-mentioned ink differing in hue (which is held in the secondary ink cartridge) may be an ink which differs in spectral reflectance from the above-mentioned three color inks. Since difference in spectral reflectance equals difference in hue, addition of another ink permits the flexible control of superposed spectral reflectance. In this way it is possible to control at will the spectral reflectance.

The second aspect of the present invention resides in a printer of the type having an ink cartridge mount to carry a plurality of ink cartridges thereon and a printing mechanism for printing on printing paper with inks received from said ink cartridges, wherein said ink cartridge mount is so designed as to carry at least three ink cartridges filled respectively with three chromatic color inks and a secondary ink cartridge filled with a color ink which smoothens waviness in the spectral reflectance curve of the nearly achromatic color produced by combination of these three colors inks.

When the three chromatic color inks are combined to form a nearly achromatic color, the spectral reflectance of the resulting achromatic color is the superposed spectral reflectance of respective color inks. This superposed spectral reflectance should ideally be uniform over the entire range of wavelengths of visible light. Unfortunately, the combination of the three chromatic color inks does not give a uniformly superposed spectral reflectance, but the resulting superposed spectral reflectance may be partly high and partly low at different wavelengths. Despite the irregular spectral reflectance, the mixed inks may completely take on an achromatic color under a certain light source. However, under a light source with a high spectral energy for a certain wavelength, the mixed inks will take on a color corresponding to that wavelength.

According to the second aspect of the present invention, which is intended to cope with this situation, the secondary ink cartridge is filled with a color ink which smoothens waviness in the spectral reflectance curve of the nearly achromatic color produced by combination of the three color inks. The ink held in the secondary ink cartridge reduces waviness in the spectral reflectance curve over the entire range of wavelengths. In other words, the spectral reflectance is made uniform. Needless to say, the above-mentioned ink cartridges should be filled respectively with at least three chromatic color inks, which produce an achromatic color upon their combination. Such inks include CMY inks and RGB inks mentioned above and additional dark and light inks.

The printer according to the present invention has ink cartridges filled respectively with at least three color inks and a secondary ink cartridge, as mentioned above. This secondary ink cartridge may be either a default one or an optional one. The printing mechanism should be so designed as to perform printing with inks supplied from these ink cartridges. The printing mechanism should be provided with ink passages for the three chromatic color inks as well as the ink held in the secondary ink cartridge.

In this way it is possible to carry out printing with an ideal achromatic color which changes very little under different light sources.

The ink held in the secondary ink cartridge may be one which has a lower spectral reflectance than each of the three color inks in the region of wavelengths in which the spectral reflectance due to combination of the three color inks is higher than that at other wavelengths. In other words, if the spectral reflectance in a certain region of wavelengths due to combination of the three color inks is higher than that at other wavelengths, then the spectral reflectance in this region of wavelengths causes the resulting color to look reddish when the light source varies. If the three inks are supplemented with another ink which has a spectral reflectance higher than that of any of the three color inks in this region of wavelengths, then it is possible to raise the spectral reflectance in other region of wavelengths while suppressing the spectral reflectance in that region of wavelengths.

Therefore, it is possible to change at will the spectral reflectance due to combination of three color inks. Particularly, in the case of achromatic color, it is possible to bring the spectral reflectance due to combination of three color inks to a certain value or it is possible to smoothen waviness in the spectral reflectance curve. In other words, it is possible to create an achromatic color consistently regardless of different light sources. Needless to say, outside the region of wavelengths in which the spectral reflectance due to combination of three color inks is higher than that at other wavelengths, it may have the same spectral reflectance as the respective spectral reflectance of the three color inks. However, it should preferably have a spectral reflectance lower than that of the three color inks so that the spectral reflectance will not increase excessively in the region of wavelengths other than that mentioned above. If the spectral reflectance is to be increased positively in the above-mentioned region of wavelengths, the ink in the secondary ink cartridge should preferably have a spectral reflectance much higher than that of any of the three color inks. In this way it is possible to make vary at will the spectral reflectance due to the combination of color inks and to form a color which is little affected by the light source.

The present invention may employ pigment-based inks for the color inks held in the above-mentioned ink cartridges. Prints with pigment-based inks are more likely to look differently depending on the light source than those printed with dye-based inks. Therefore, the use of pigment-based inks effectively prevents color variation in a situation where color variation easily occurs depending on the light source. In this way it is possible to effectively prevent color variation in a situation where color variation easily occurs depending on the light source.

The three color inks to be held in the above-mentioned ink cartridges may be cyan ink, magenta ink, and yellow ink, and the color ink to be held in the secondary ink cartridge may be either or both of red ink and violet ink.

The cyan ink has a high spectral reflectance at wavelengths of 450-500 nm, the yellow ink has a high spectral reflectance at wavelengths of 500-700 nm, and the magenta ink has a high spectral reflectance at wavelength of 400-500 nm and 600-700 nm. All of them have a high spectral reflectance at wavelengths of about 500 nm. The red ink and violet ink have a very low spectral reflectance at wavelengths of about 500 nm and absorb the light of this wavelength.

Therefore, the tendency for a combination of CMY inks to increase in spectral reflection at wavelengths of about 500 nm is alleviated by the addition of R and V inks to them. Instead, the spectral reflectance increases at wavelengths slightly longer and shorter than 500 nm. Thus an adequate ink combination may be made such that the spectral reflectance does not abruptly increase at wavelength in the neighborhood of 500 nm and the mixed inks take of a nearly ideal achromatic color.

Incidentally, although the secondary ink cartridge may be filled with either R ink or V ink, it is desirable to use two ink cartridges filled with both inks to easily produce a variety of colors, because the hue angle of R is between those of M and Y and the hue angle of V is between those of M and C. This ink combination is readily applicable to many ordinary printers which employ ink cartridges filled respectively with CMY inks. In this way it is possible to produce an ideal achromatic color.

An example of the ink combination is defined as follows in terms of spectral reflectance. The spectral reflectance of the cyan ink increases as the wavelength increases from 400 nm, remains at about 80% at the wavelengths ranging from 450 nm to 500 nm, decreases as the wavelength increases from 500 nm to 600 nm, and remains below 10% at the wavelengths ranging from 600 nm to 700 nm; the spectral reflectance of the yellow ink rapidly increases as the wavelength increases from about 450 nm, and remains at about 80% at the wavelengths ranging from 500 nm to 700 nm; the spectral reflectance of the magenta ink increases once as the wavelength increases from 400 nm, decreases as the wavelength increases from 450 nm to 550 nm, increases as the wavelength increases from 550 nm to 600 nm, and remains at about 80% as the wavelength increases from 600 nm; the spectral reflectance of the red ink is about 30% at the wavelength of 400 nm, decreases as the wavelength increases, remains at about 10% as the wavelength increases to about 550 nm, increases once as the wavelength increases from 550 nm, and remains at about 80% as the wavelength increases to about 620 nm; and the spectral reflectance of the violet ink increases once as the wavelength increases from 400 nm, decreases as the wavelength increases from 450 nm to 500 nm, remains constant as the wavelength increases from 500 nm to 600 nm, and increases as the wavelength increases from 600 nm.

The above-mentioned ink combination is realized by a printer which has an ink cartridge mount to carry ink cartridges filled respectively with cyan ink, magenta ink, and yellow ink and also to carry a secondary ink cartridge filled with either or both of red ink and violet ink which differ in hue from the three color inks. The ink in the secondary ink cartridge differs in spectral reflectance from the three color inks. The ink held in the secondary ink cartridge may be one which has a lower spectral reflectance than each of the three color inks in the region of wavelengths in which the spectral reflectance due to combination of the three color inks is higher than that at other wavelengths.

In this way the spectral reflectance due to the combination of the color inks can be changed at will; particularly, the achromatic color resulting from the combination of the color inks has a spectral reflectance close to a constant value. Thus it is possible to create an achromatic color regardless of the light source.

According to another embodiment of the present invention, the ink cartridge mount is so designed as to carry ink cartridges for six or more color inks and one or more of them can be interchanged with the secondary ink cartridge. In other words, the printer provided with six or more color inks may have one or more color inks replaced by the ink held in the secondary ink cartridge.

For example, a printer with C, M, Y, K, lc, and lm ink cartridges may be modified such that any of lc, lm, and K ink cartridges is replaced by any of R and V ink cartridges. Of course, any printer is acceptable which carries C, M, Y, K, lc, lm, D, and Y ink cartridges. The printer that permits the ink exchange as mentioned above will be able to perform printing with R and V inks according to need while performing ordinary printing with conventional C, M, Y, K, lc, and lm inks. In this way it is possible to replace the conventional inks with the ink pertaining to the present invention.

Needless to say, with a print head which can mount many inks, combination of CMYKlclm inks can be made previously. In this way it is possible to carry out printing with said ink combination without replacing inks.

According to another embodiment, the printer of the present invention is provided with an image data acquisition unit which acquires image data representing dot-matrix pixels, a color conversion table storing unit which stores the color conversion table to specify the correspondence between said image data and the ink color image data defining the colors of pixels by the chromatic colors of at least three color inks mentioned above and the color held in the secondary ink cartridge mentioned above, a color conversion unit which converts said image data into said ink color image data by referencing said color conversion table, a printing data generating unit which generates printing data to execute printing with colors specified by the ink color image data which has undergone color conversion, and a print mechanism control unit which controls the above-mentioned print mechanism in response to said printing data.

According to the present invention, printing is performed by converting the image data consisting of dot matrix pixels into the ink color image data consisting of a combination of the ink colors used by the printer. If a color conversion table is provided which specifies the correspondence between the ink color image data (including the color of the ink held in the secondary ink cartridge) and the image data acquired as mentioned above, then it is possible to readily accomplish the color conversion by means of the color conversion table as intended in the present invention. In addition, printing with the color ink held in the secondary ink cartridge can be accomplished if printing data is generated which specifies the amount of ink to be used in response to the specification for each color of the ink color conversion data after said color conversion. In this way the present invention makes it possible to accomplish color conversion as specified in the present invention as one of the general control unit and to perform printing with the color inks specified in the present invention.

The present invention may also be embodied in such a way that the above-mentioned color conversion table is prepared by color separation which is a process of replacing at least one of the three chromatic colors with the color of the ink held in the secondary ink cartridge. That is, there has been an established procedure to specify by using a color conversion table the color to be expressed by a combination of at least three chromatic colors. Therefore, so long as the combination of the three chromatic colors is decided, it is possible to readily make a color equivalent to the original one with the color of the ink held in the secondary ink cartridge, by replacing any one of the colors with the color of the ink held in the secondary ink cartridge.

If the above-mentioned color separation process can replace any one of the three chromatic colors with the color of the ink held in the secondary ink cartridge, then the replaced color is immediately made to correspond with the combination of the RGB data in the image data. Therefore, it is possible to easily prepare the color conversion table with the color of the ink held in the secondary ink cartridge. In this way it is possible to easily make a color equivalent to the original color by using the color of the ink held in the secondary ink cartridge.

According to a further another embodiment of the present invention, the above-mentioned color separation process is accomplished in such a way that the magenta and yellow inks are replaced with the red ink. That is, since the hue angle of R exists between those of M and Y, the color separation process can be accomplished easily if M and Y are replaced with R in the printer which employs CMY inks. There are a variety of guides for replacement, which include the maximum possible replacement. Of course, it is possible to prepare a more accurate color conversion table by measuring the printed color with the ink in question after color separation process. In this way it is possible to easily perform the color separation process.

According to a further another embodiment of the present invention, the above-mentioned color separation process is accomplished in such a way that the magenta and cyan inks are replaced with the violet ink. That is, since the hue angle of V exists between those of M and C, the color separation process can be accomplished easily if M and C are replaced with V in the printer which employs CMY inks. There are a variety of guides for replacement, which include the maximum possible replacement. Of course, it is possible to prepare a more accurate color conversion table by measuring the printed color with the ink in question after color separation process. In this way it is possible to easily perform the color separation process.

Of course, it is possible to replace R with C, M, and Y. In this case, the ratio of C is smaller than that of M and Y as a matter of course. This is also true for V.

Incidentally, the printer as mentioned above may exist alone or may be built into a certain apparatus. The scope of the present invention is not limited to them but embraces a variety of embodiments. Thus, the present invention may be embodied as software or hardware depending on the situation.

The recording medium as software may be a magnetic recording medium or magneto-optical recording medium. It also includes any recording media which will be developed in the future. The software may be primary or secondary copies (or copies in any stage). The software may be supplied through communication lines. The present invention may be embodied partly as software and partly as hardware. Another embodiment would be such that part of the software is stored in a recording medium and it is read into the computer according to need.

The procedure of the print control program is based on the present invention; therefore, it should be understood that the present invention is also embodied as a method.

BRIEF DESCRIPTION OF THE DRAWINGS

FIG. 4 is a diagram showing one example of the LUT.

DESCRIPTION OF THE PREFERRED EMBODIMENTS

Figure 1:
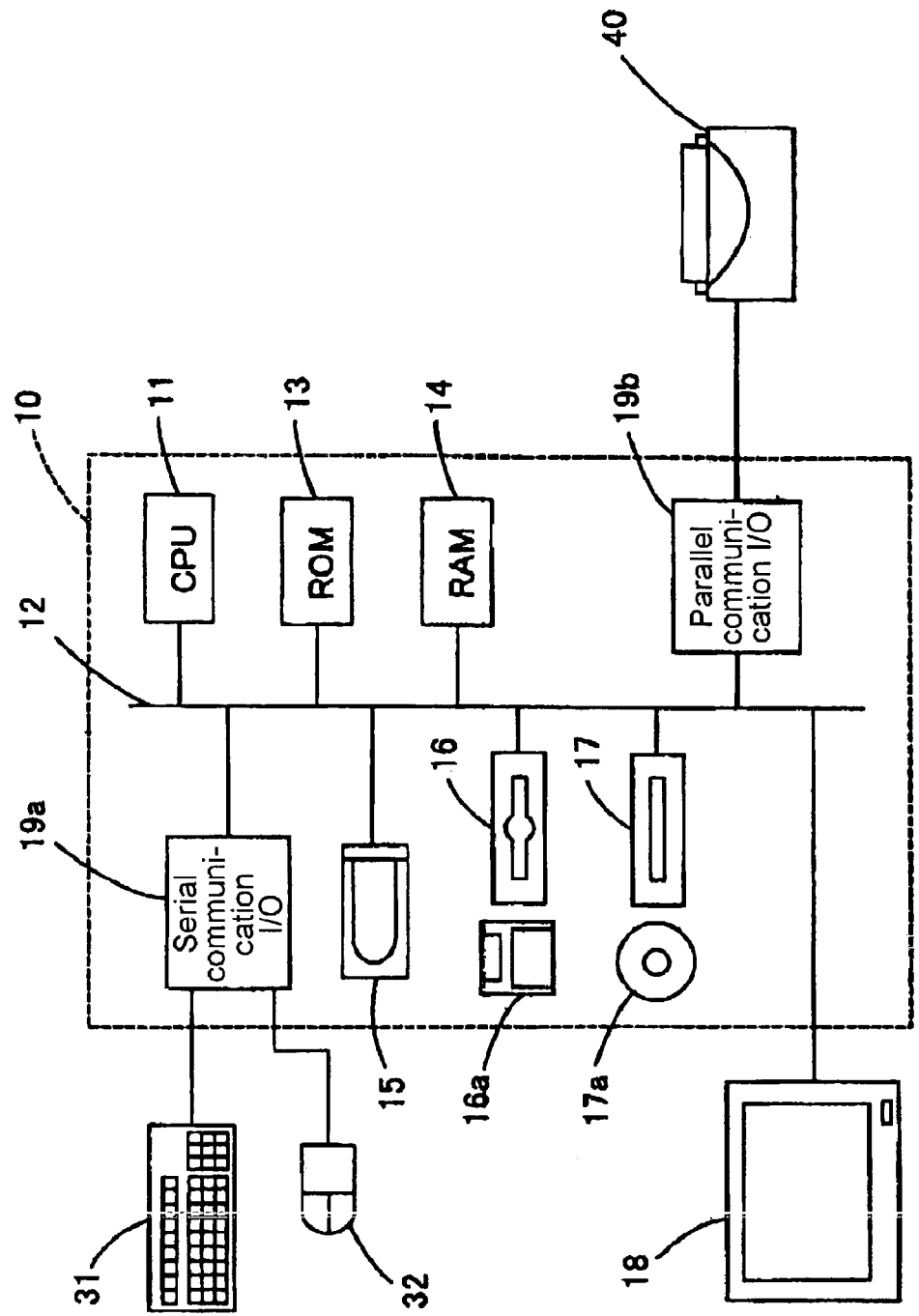
FIG. 1 is a schematic diagram showing the hardware structure of the printing system.
Figure 2:
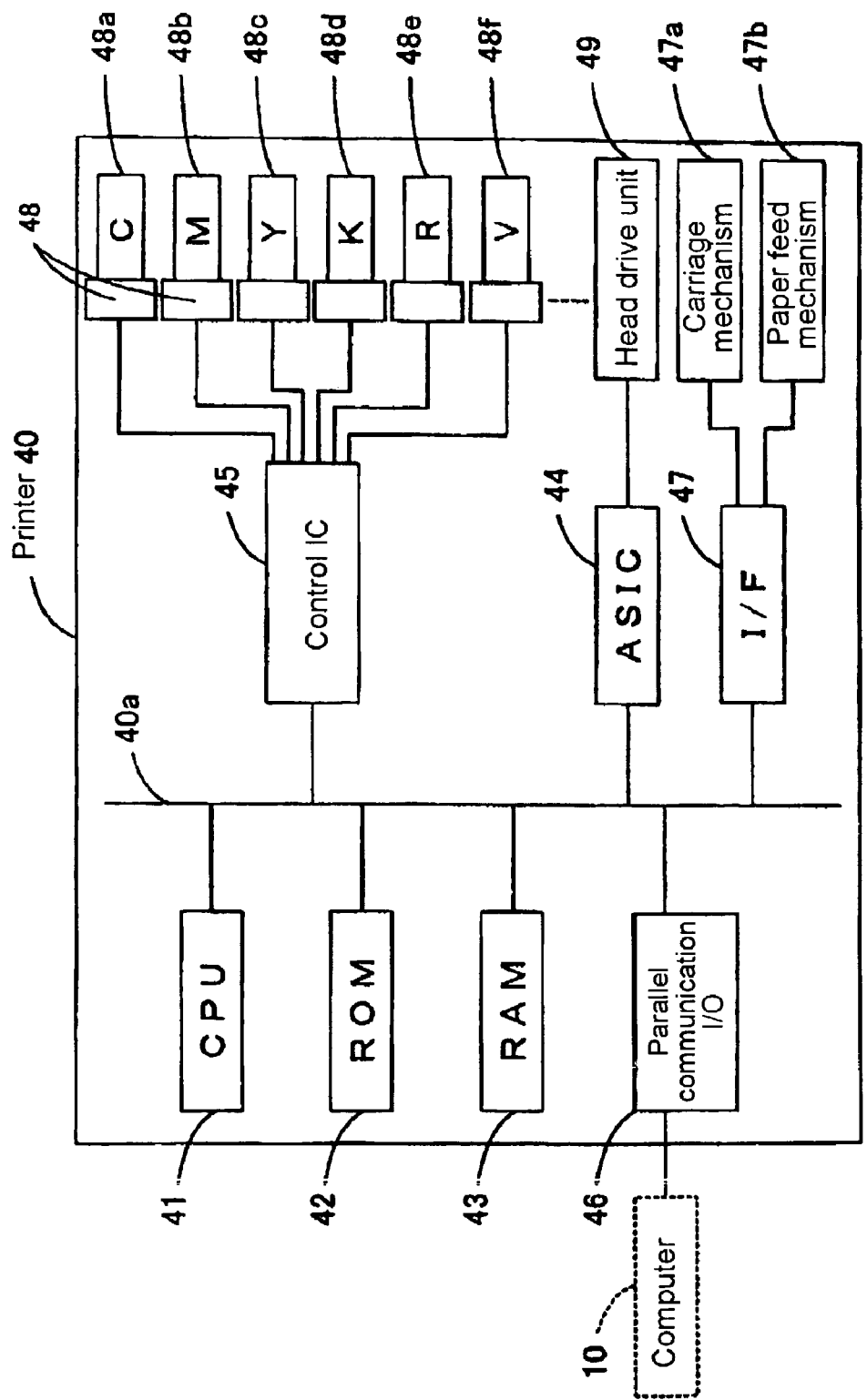
FIG. 2 is a schematic diagram showing the hardware structure of the printer.
Figure 3:
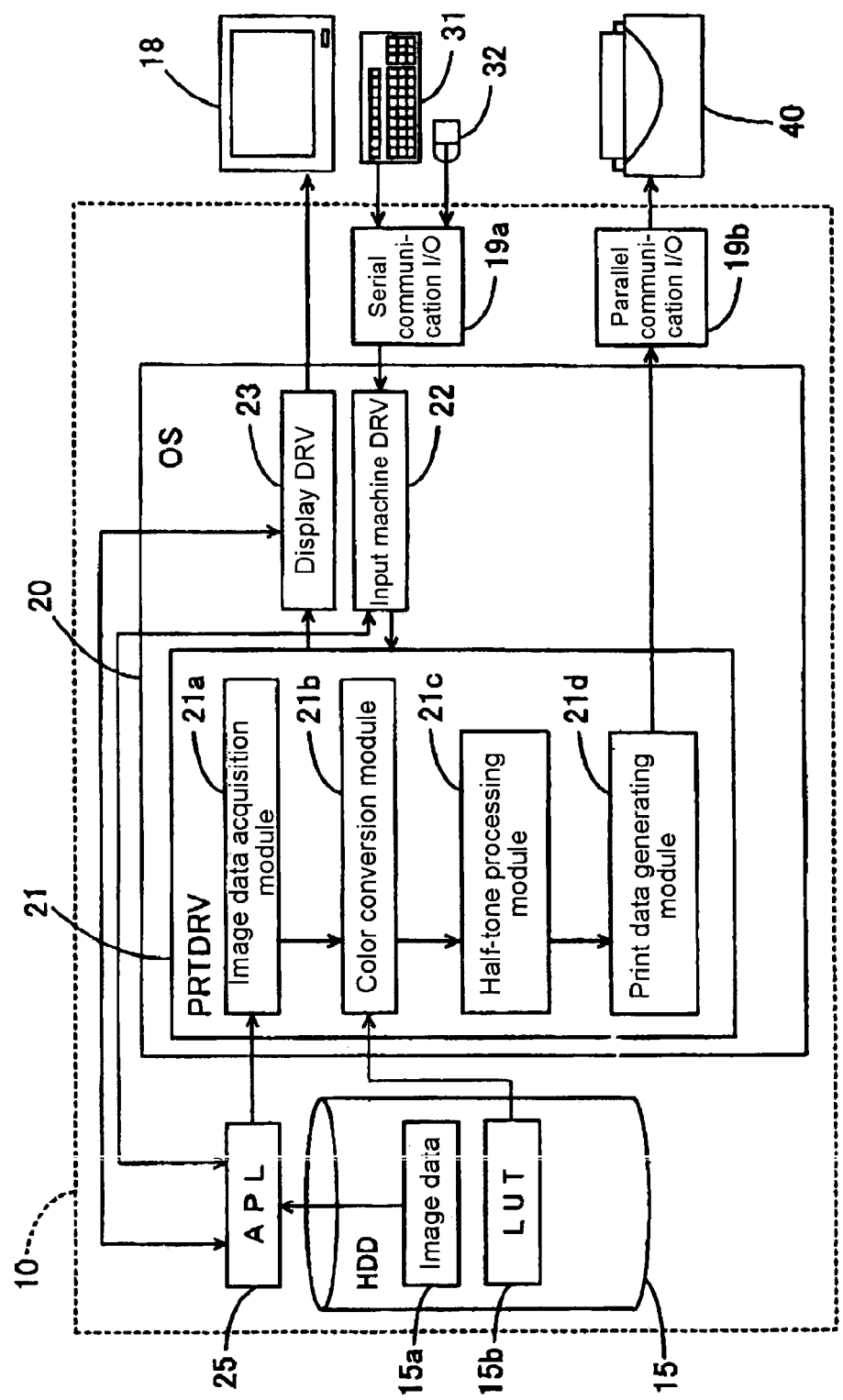
FIG. 3 is a schematic diagram showing the structure of the main control system of the printer to be realized by a computer.

The embodiments of the present invention will be described below in the following order.
(1) Constitution of the present invention:
(2) Constitution of the LUT:
(3) Printing process:
(4) Printing of images:
(5) Elimination of dependence on light sources:
(6) The second embodiment:
(7) Other embodiments:
    (1) Constitution of the Present Invention:

FIG. 1 schematically shows the hardware structure of the printing system. FIG. 2 schematically shows the hardware structure of the printer. FIG. 3 schematically shows the structure of the main control system of the printer to be realized by a computer. This embodiment is a printing system consisting of a printer and a computer to control the printer. The computer 10 has a CPU 11 which plays the essential part in computational operations. This CPU 11 is capable of accessing a ROM 13 and a RAM 14 (both storing BIOS etc.) through a system bus 12.

To the system bus 12 are connected a hard disk drive (HDD) 15, a flexible disk drive 16, and a CD-ROM drive 17, which are external storage devices. The HDD 15 stores an OS 20 and an application program (APL) 25, which are transferred to the RAM 14, and the CPU 11 accesses the ROM 13 and the RAM 14 from time to time to execute the software. In other words, the CPU 11 executes programs by using the RAM 14 as a temporary work area.

To the computer 10 are connected a keyboard 31 and a mouse 32 (which are input devices) through a serial communication I/O 19a. To the computer 10 is also connected a display 18 through a video board (not shown). In addition, the computer 10 can be connected to a printer 40 through a parallel communication I/O 19b. Incidentally, the construction of the computer 10 is explained in a simplified manner. A personal computer of common structure can be used. The computer used in the present invention is not limited to personal computers. The computer for this embodiment is a so-called desktop-type computer; however, it may be a note-type computer or a mobile computer. The interface to connect the computer 10 with the printer 40 is not restricted to that shown above. It may include serial interface, SCSI, USB, and others, or any interface which will be developed in the future.

In this embodiment, programs are stored in the HDD 15; however, the recording medium is not restricted to it. The recording medium additionally includes a flexible disk 16a and CD-ROM 17a. The programs stored in these recording media are read into the computer 10 through the flexible disk drive 16 and CD-ROM drive 17 and then installed in the HDD 15. They are further read into the RAM 14 through the HDD 15, and then they control the computer. The recording media are not restricted to them; however, they may include magneto-optical disk or the like. In addition, it is also possible to use a flush card (non-volatile memory) as a semiconductor device. The program of the present invention may be downloaded from an external file server through a modem and a communication line (as a transmission medium).

As shown in FIG. 2, the printer 40 has a bus 40a, to which are connected a CPU 41, a ROM 42, a RAM 43, an ASIC 44, a control IC 45, a parallel communication I/O 46, and an interface (I/F) 47 for transmission of image data and drive signals. The CPU 41 controls each part according to the program written in the ROM 42 while utilizing the RAM 43 as its work area. The ASIC 44 is an IC which is customized to drive the printer head (not shown). It performs processing to drive the printer head while transmitting and receiving prescribed signals to and from the CPU 41. It also sends voltage data to be applied to the head drive unit 49.

The head drive unit 49 is a circuit consisting of a dedicated IC and a driving transistor. The head drive unit 49 generates a voltage pattern to be applied to the piezoelectric element (which is built into the print head) according to the voltage data entered from the ASIC 44. The print head has cartridge holders 48 to hold ink cartridges 48a to 48f filled respectively with six pigment-based inks. The cartridge holders 48 are connected to tubes for individual inks, so that they are supplied with inks. The piezoelectric element works in the ink chamber communicating with the tube and the discharge port, thereby discharging inks. Incidentally, in this embodiment, general-purpose CMYK inks and the RV inks (specified in the present invention) are used. In the present invention, pigment-based inks produce a pronounced effect; however, dye-based inks will do as well.

Incidentally, RV inks differ in hue from CMY inks. As mentioned later, they prevent the achromatic color produced by a combination of CMY inks from changing in spectral reflectance. They correspond to the colors of the inks held in the secondary ink cartridge. The above-mentioned cartridge holder 48 corresponds to the above-mentioned ink cartridge mount, and the above-mentioned ASIC 44, head drive unit 49, carriage mechanism 47a, and paper feed mechanism 47b correspond to the above-mentioned print mechanism.

The print head has an ink discharge face, on which are arranged six sets of nozzle columns through which six color inks are discharged. The nozzle columns are arranged in the main scanning direction of the print head. Each nozzle column has a plurality of nozzles (say, 48 nozzles) which are arranged at certain intervals in the secondary scanning direction. The cartridge holder 48 has ink supply needles, which come into contact with the ink supply port (not shown) formed in the ink cartridges 48a to 48f, thereby forming the ink supply passage. Thus, the ink in the ink cartridge is supplied to the print head through the tube.

The control IC 45 controls the cartridge memory, which is non-volatile memory mounted in each ink cartridge 48a to 48f. When the ink cartridge is mounted on the cartridge holder 48, the cartridge memory is electrically connected to the control IC 45. The CPU 41 sends and receives prescribed signals to and from the control IC 45, thereby reading information about the color and residual quantity of ink recorded in the cartridge memory and renews information about the residual quantity of ink.

The parallel communication I/O 46 is connected to the parallel communication I/O 19b of the computer 10. The printer 40 receives data to specify the dot density of CMYKRV and the print job of page description language from the computer 10 through the parallel I/O 46. Upon receipt of various requests from the computer 10, the communication I/O outputs to the computer 10 information from the control IC 45 about ink color and mounting state.

To the I/F 47 are connected the carriage mechanism 47a and the paper feed mechanism 47b. The paper feed mechanism 47b consists of a paper feed motor and paper feed roller; it feeds print recording medium (such as print paper), thereby performing secondary scanning. The carriage mechanism 47a consists of a carriage which mounts the print head and a carriage motor which runs the carriage by means of a timing belt, so that the print head performs main scanning. The print head having a plurality of nozzles arranged in the secondary scanning direction drives the piezoelectric elements in response to drive signals delivered from the head drive unit 49 according to the head data consisting of bit strings, so that ink droplets are discharged dot by dot from each nozzle.

The printer 40 performs printing under control by the printer driver installed in the computer 10. As shown in FIG. 3, the computer 10 in this embodiment has OS 20 in which are installed a printer driver (PRTDRV) 21, an input machine driver (DRV) 22, and a display driver (DRV) 23. The display DRV 23 is a driver to control the display of image data in the display 18. The input machine driver DRV 22 is a driver to receive code signals from the above-mentioned keyboard 31 and mouse 32 which are entered through the serial communication I/O, thereby accepting prescribed input operations.

The APL 25 is an application program which executes the retouching of color images. The user can print the color image with the printer 40 by operating the input machines while the APL 25 is being executed. In other words, the APL 25 reads the image data 15a stored in the HDD 15 to the RAM 14 according to the user's instruction and displays the image (based on the image data 15a) on the display 18 through the display DRV 23. When the user operates the above-mentioned input machines, the content of operation is acquired through the input machine DRV 22 and the content is interpreted. The APL 25 issues printing instructions and performs various processing (such as retouch) according to the content of operation.

The printing instructions from the APL 25 drives the above-mentioned PRTDRV 21. The PRTDRV 21 sends data to the display DRV 23 and displays the UI (not shown) for input of information necessary for printing. The user can set parameters, such as number of copies and pages, by means of the UI (not shown). The PRTDRV 21 accepts these parameters through the input machine DRV 22. Upon receipt of these parameters, the PRTDRV 21 converts the above-mentioned image data 15a, in which colors are specified in terms of sRGB by referencing LUT 15b mentioned later, into data of each color of CMYKRV, thereby preparing the print data. The print data are sent to the above-mentioned printer, so that the printer performs printing.

(2) Constitution of the LUT:

FIG. 4 shows an example of the LUT 15b. In the LUT 15b, the RGB data and the CMYK data each have values of 0 to 255 (or each color has 256 tones, 8 bits). In FIG. 4, the region in which each value of RGB is close to "0" is the one which is close to black, and the region in which each value of RGB is close to "255" is the one which is close to white. Of course, it is possible to assign more than 8 bits (say, 16 bits or 32 bits) to represent fine tones. The reference points of the RGB data are formed by dividing the tone range by 16 for each color component, and all the combinations for the tone values "0, 16, 32, ... 255" are specified for each color of RGB. Therefore, the LUT 15b has $17^3$ (4913) reference points. In this embodiments, the tone range is divided into 16 sections; however, this number may be changed into 8 sections, 32 sections, or 64 sections, according to the capacity of the hard disk drive or the accuracy required.

The tone value of each color of CMYKRV is specified by the value of "0~255" for these reference points. At the time of color conversion, these RGB data and CMYKRV data are referenced, and RGB data are converted into CMYKRV data by interpolation. More than one look-up tables may be prepared for each ink set and medium to be used by the printer 40, so that they are selected as the occasion may demand. Incidentally, in this embodiment, the above-mentioned image data 15a is a dot-matrix data which expresses the tone of each color component of RGB. This data conforms to the sRGB standard. Of course, the LUT 15b may be so constructed as to possess the typical values of sRGB data as data; alternatively it may be constructed such that the color is specified for a specific set of RGB data in the previously determined order and the typical values of RGB data may be omitted.

Figure 5:
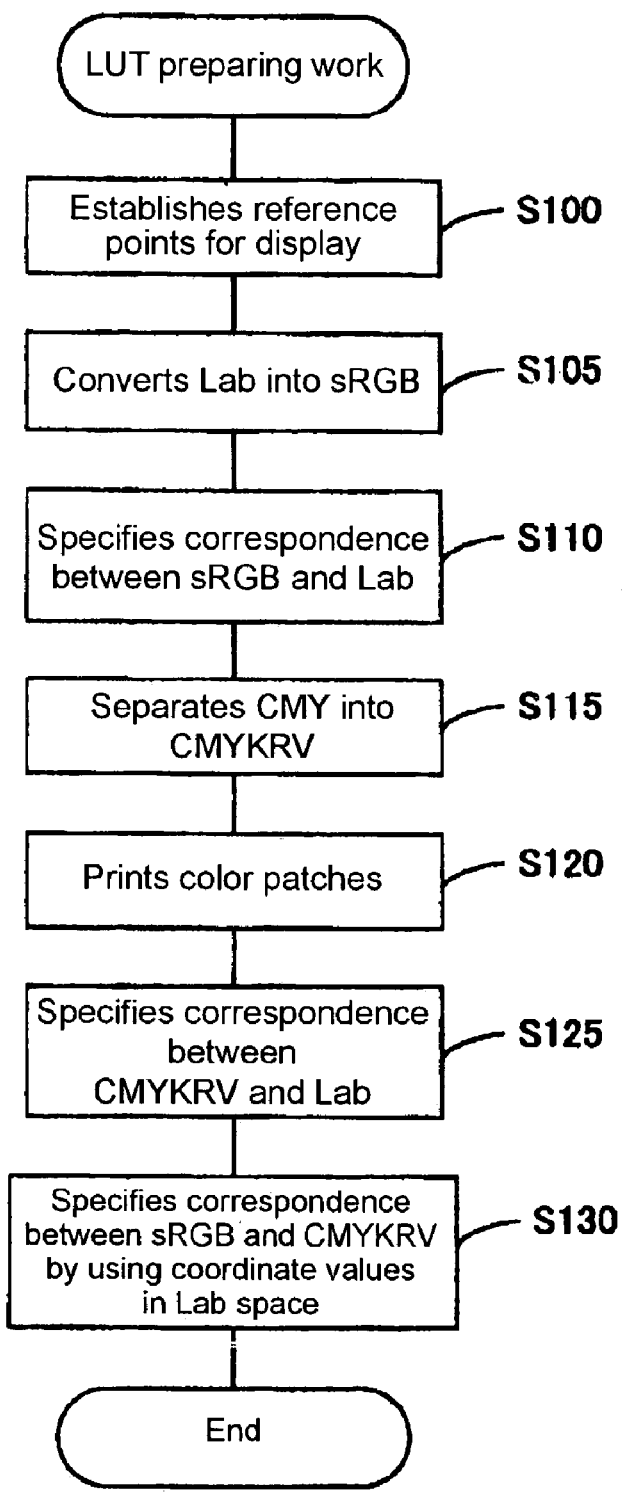
FIG. 5 is a flowchart used to prepare the LUT.

The LUT 15b may be prepared by a series of steps shown in FIG. 5 as a flowchart. These steps need a large amount of arithmetic operation, which should desirably be carried out with the help of a computer. The LUT 15b specifies the sRGB data which include all of the sRGB space. It converts the sRGB data (used for the display 18) and the CMYKRV data (used for the printer 40) into the coordinate values of the Lab color space, and it also makes the sRGB data to correspond with the CMYKRV data in the Lab color space. The first step S100 to achieve this objective is to extract the reference point of the display 18. This step establishes $17^3$ values for the sRGB tone as shown in the left side in FIG. 4.

The step S105 is intended to convert the established sRGB tone values into the coordinate values of the Lab color space. Image data conforming to the sRGB standard can be converted into the coordinate values of the Lab color space by the known conversion formula. Therefore, the step S105 may be carried out for conversion into the Lab coordinates with the help of the conversion formula. Alternatively, the step S105 may be carried out in such a way that the color due to the reference point is displayed on the display 18 and the Lab coordinate of the color is acquired by colorimetry. As a consequence, the Lab coordinate values of the color corresponding to the reference point of sRGB are obtained. The step S110 is intended to specify the correspondence between the $17^3$ sRGB tone values (shown in the left side in FIG. 4) and the Lab tone values.

The step S115 is intended to add K to CMY and to further add RV inks, thereby reducing the value of any of CMY or the combination thereof and specifying the CMYKRV data. This step performs the separation of CMY data into CMYKRV data. In this embodiment, the amount of CMY ink discharged is allocated to the amount of RV ink discharged as far as possible, and the color with high lightness is separated into R ink as gar as possible and the color with low lightness is separated into V ink as far as possible. To be concrete, R has an intermediate hue between Y and M in the Lab color space and V has an intermediate hue between C and M, therefore, YM is separated into R as far as possible and CM is separated into V as far as possible.

In this embodiment, one part of Y ink and one part of M ink are allocated to one part of R ink and one part of C ink and one part of M ink are allocated to V ink as far as possible. For example, if CMY to express one color is separated into CMYK by any known method so that the ratio of the amount of CMYK ink is 50:30:20:10, then it is provided that the ratio of the amount of CMYKR ink is 50:10:0:10:20 and the ratio of the amount of CMYKRV ink is 40:0:0:10:20:10.

Figure 6:
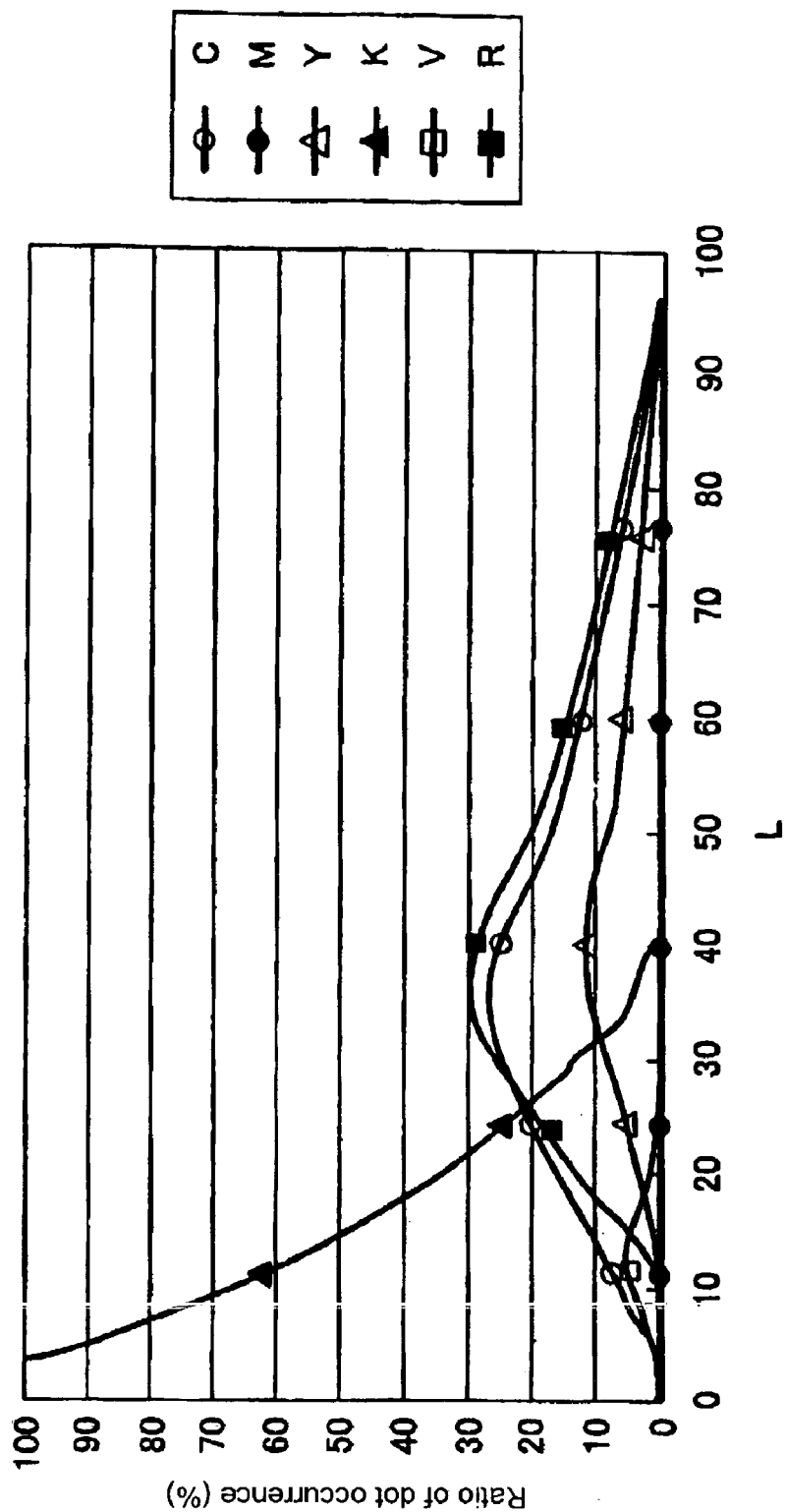
FIG. 6 is a diagram showing one example of the ratio of occurrence of ink dots of each color.

FIG. 6 shows how the achromatic color ink dots occur in different ratios after the above-mentioned color separation. The abscissa represents the lightness L in the Lab color space. In this embodiment, color separation is accomplished such that as much RV ink as possible is used. Since M ink is used for color separation of both R ink and V ink, M ink is "0" in the achromatic color shown in FIG. 6. Of course, the above-mentioned method for color separation is merely one example, and color separation may be accomplished in various ways as follows. The lower limit is established so that each of CMY ink does not decrease below the prescribed amount, or the upper limit is established so that each of RV ink does not increase above the prescribed amount. Or, the ratio of the amount of YM ink and the amount of R ink is other than 1 and the ratio of the amount of CM ink and the amount of V ink is other than 1.

After color separation in the step S115, the step S120 is carried out to print a number of patches with CMYKRV data which has undergone color separation. The CMYKRV data used for printing color patches is grasped, and the color patches undergo colorimetry with a colorimeter in the step S125, so that the CMYKRV data is made to correspond with the coordinate values of the Lab color space. This procedure gives the Lab coordinate values of the color corresponding to the reference point of sRGB and the Lab coordinate values corresponding to the CMYKRV data. These Lab coordinate values are used in the step S130 to specify correspondence between the sRGB data and the CMYKRV data.

That is, the LUT 15b is prepared. It is not always the case that the coordinate values in the Lab color space obtained in the step S120 agree with one another, and the relation between them can be obtained by interpolation or optimal value seeking method. Adequate interpolation is possible if a large number of color patches are printed and the coordinate values of the Lab color space are acquired for many colors.

Figure 7:
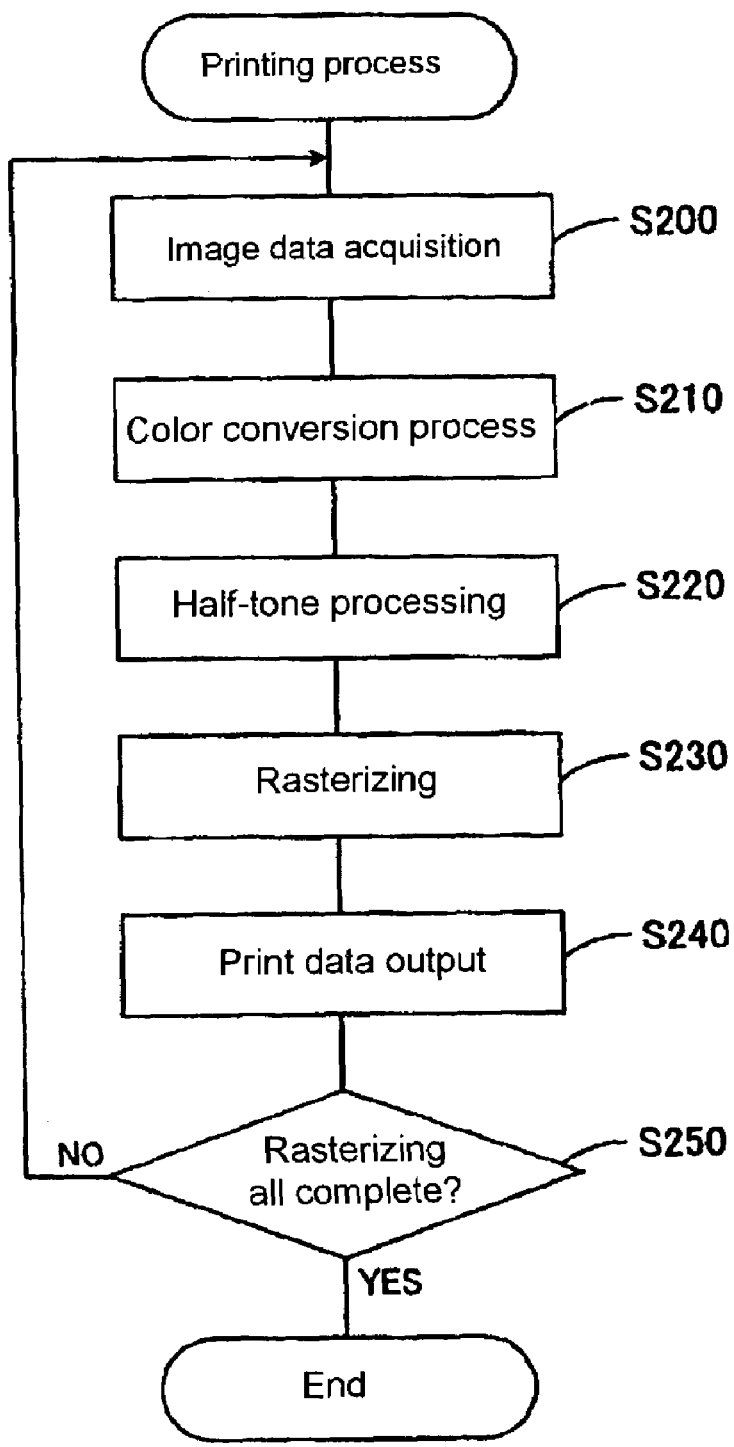
FIG. 7 is a flowchart for printing.

(3) Printing Process:

In this embodiment, the above-mentioned PRTDRV 21 performs color conversion by using the above-mentioned LUT 15b and causes the printer 40 to perform printing. In other words, the PRTDRV 21 has the image data acquisition module 21a, the color conversion module 21b, the half-tone processing module 21c, and the print data generating module 21d, as shown in FIG. 3. When the user issues an instruction for printing through the above-mentioned APL 25, printing is performed according to the flow shown in FIG. 7. When printing starts, the image data acquisition module 21a acquires the image data 15a from the RAM 14 in the step S200.

Then, the image data acquisition module 21a activates the color conversion module 21b in the step S210. The color conversion module 21b is a module to convert the RGB tone value into the CMYKRV tone value, and it converts each dot data of the image data 15a into the dot data of CMYKRV in the step S210. When the color conversion module 21b performs color conversion to generate the tone data of CMYKRV, the half-tone processing module 21c is activated and the tone value of CMYKRV is transferred to the half tone processing module 21c in the step S220.

The half-tone processing module 21c is a module which performs half-tone processing to express the CMYKRV tone value of each dot in terms of the recording density of ink droplets. It generates the head drive data to eject ink according to the recording density created after conversion by the step S220. The print data generating module 21d receives the head drive data and rearranges them in the order used by the printer 40 in the step S230. In other words, the printer 40 is provided with a nozzle array (not shown) as a device to eject ink. The nozzle array has a plurality of nozzles arranged in the secondary scanning direction. Therefore, two or more sets of data which are several dots apart in the secondary scanning direction are used simultaneously.

Then, rasterizing is carried out in which rearrangement is made so that sets of data which are used simultaneously among those which are arranged in the main scanning direction are buffered simultaneously in the printer 40. After this rasterizing, it generates printing data by adding prescribed information (such as image resolution etc.) and outputs the result to the printer 40 through the parallel communication I/O 19b. Responding to the printing data, the printer 40 prints the image displayed on the display 18. The printer 40 causes the inks of CMYKRV colors to stick to the printing medium on the basis of the CMYKRV tone value data as mentioned above.

Figure 8:
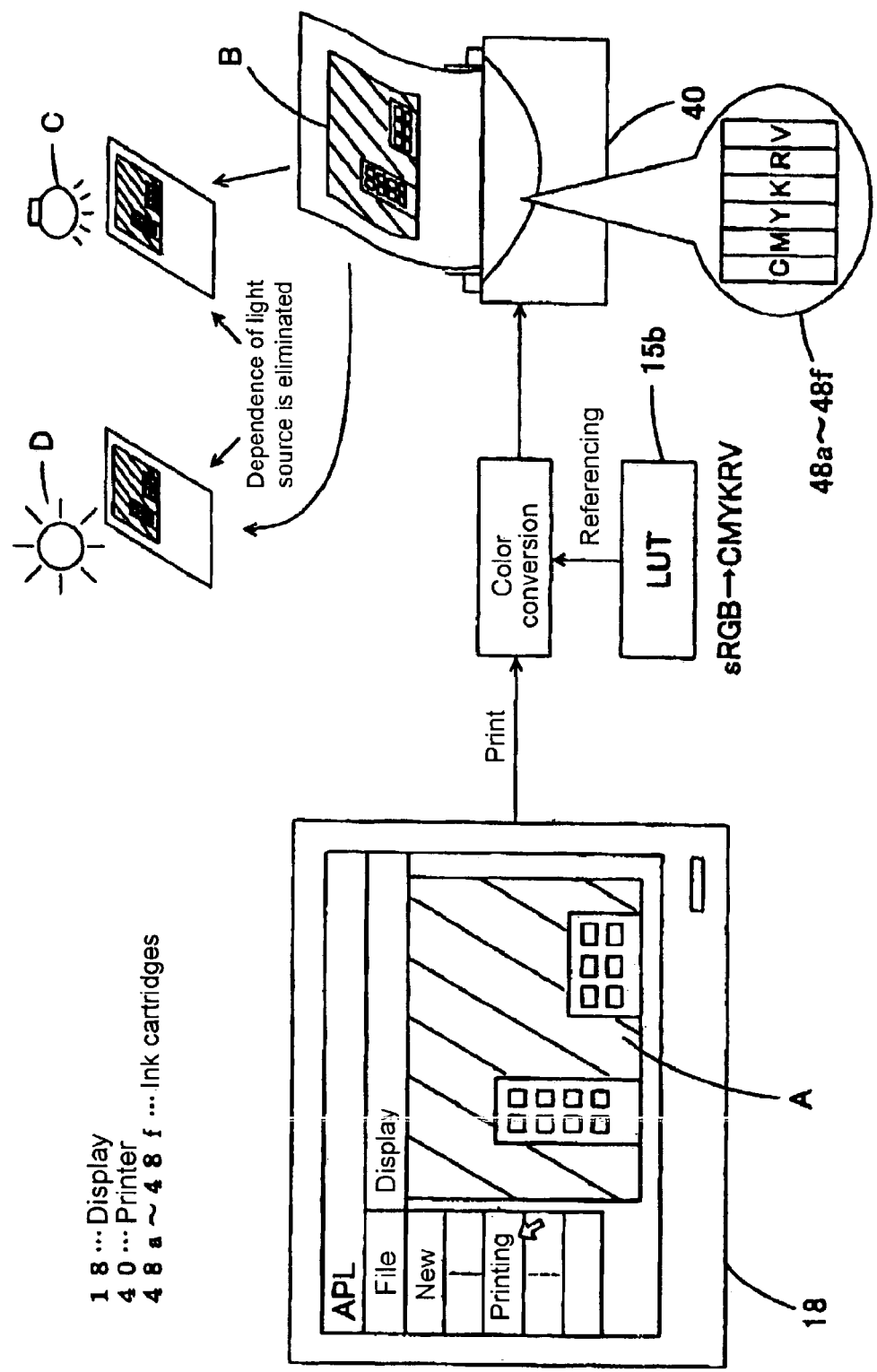
FIG. 8 is a conceptual diagram showing the operation of image printing.

(4) Printing of Images:

The action of printing images according to the above-mentioned constitution will be explained below with reference to the conceptual drawing shown in FIG. 8. In FIG. 8, the screen image of the display 18 indicates the execution image of the APL 25. After the APL 25 has read out the image data 15a, the image data 15a is stored in the RAM 14 and, upon processing by the display DRV 23, the image A based on the image data 15a is displayed on the display 18. Since the effect of the present invention is remarkable in almost achromatic colors with low saturation, the following description is made with reference to the image A which has a dark background and consists mainly of almost achromatic colors. The APL 25 permits retouching for the image A displayed on the display 18 and gives instructions to print the image A. The screen image in FIG. 8 indicates that the program has read out the image data 15a from the HDD 15 and the printer is waiting for instruction for printing. Now, the user can give instructions for printing by selecting the print tab in the file menu by operating the mouse 32.

Almost achromatic colors contained in the image A should ideally have an almost uniform spectral reflectance over the entire visible regions of wavelengths. Change in almost achromatic colors is readily discernible by the human eye. Therefore, if there is a region of wavelengths which has an uneven spectral reflectance, the reflected light significantly changes in energy when the light source changes in such a way as to strengthen the energy of specific wavelengths. The result is a change in a specific color. However, if CMYK inks are used in combination with RV inks, the spectral reflectance of almost achromatic colors becomes more uniform over the entire visible region of wavelengths than that in the case where CMYK inks are used alone. It follows, therefore, that the resulting ink colors are less vulnerable to change in light source.

According to the present invention, it is possible to perform printing with CMYK inks incorporated with RV inks, because sRGB data is converted into CMYKRV data by means of the LUT 15b and the printer 40 is provided with ink cartridges 48a-48f each filled CMYKRV inks. Incidentally, in this embodiment, the inks are arranged in the order of CMYKRV; however, this order may be changed as required. Therefore, the image B produced by the printer 40 looks almost alike regardless of the light source C (room lamp) or the light source D (sunlight) under which it is observed. Therefore, the almost achromatic color of the print does not take on any color.

As shown in FIG. 4, the LUT 15 is a table in which the sRGB data corresponds with the CMYKRV data. In the step S210, arbitrary RGB tone values are made to correspond with the CMYKRV tone values by interpolation on the basis of these reference points. Interpolation may be accomplished by any known method, such as linear interpolation and spline interpolation. Another possible way of interpolation is to develop the reference points in LUT 15b into a number of reference points, store the developed reference points in RAM 14, and perform interpolation by referencing such buffered reference points in RAM 14. Of course, it is also permissible to perform color conversion by using a color conversion table or by using a profile which previously defines the conversion matrix.

Figure 9:
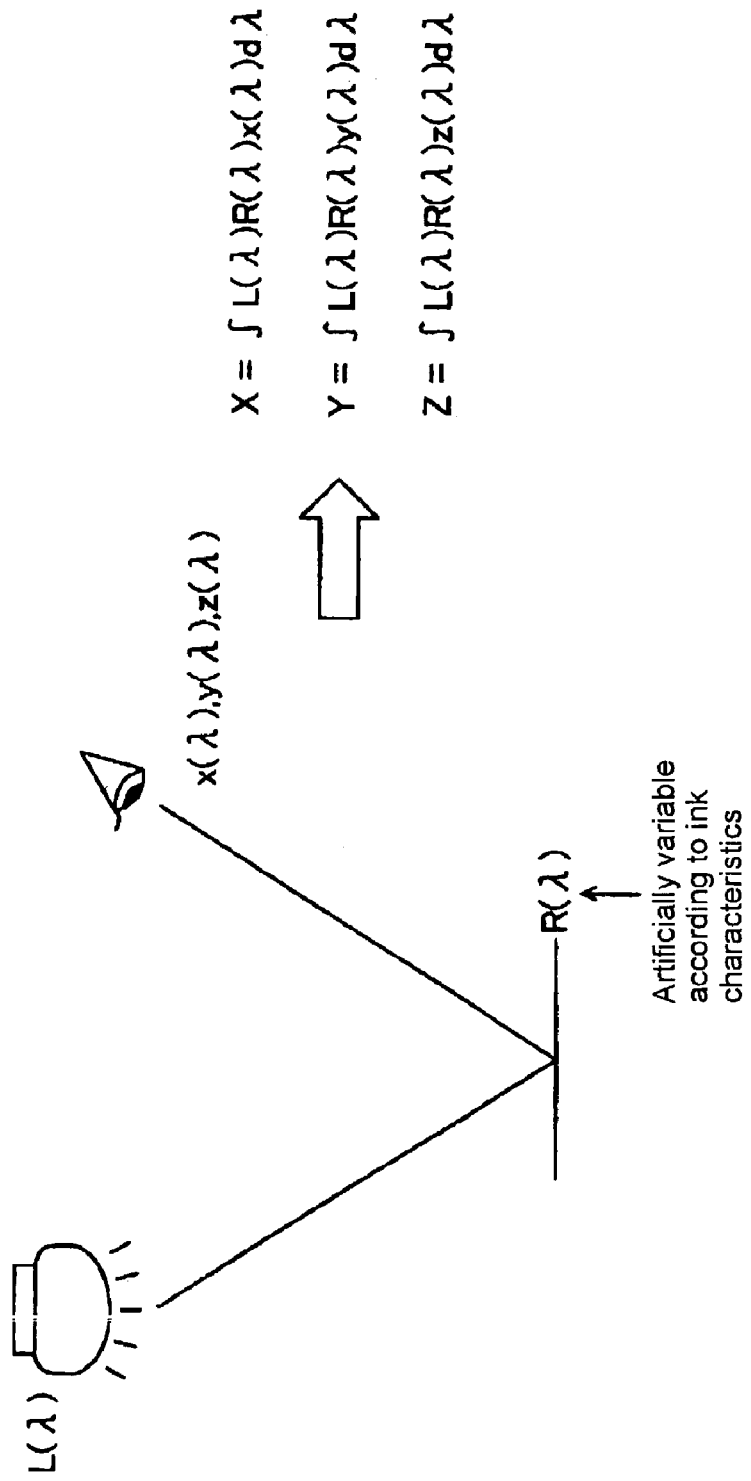
FIG. 9 is a diagram illustrating how colors are perceived by the human eye.

(5) Elimination of Dependence on Light Sources:

A mention is made below of the mechanism to eliminate the dependence of color on the light source. The human eye perceives colors in the following manner. FIG. 9 illustrates how the human eye perceives colors. The human eye discriminates colors from one another according to the wavelengths of light. Therefore, how the human eye perceives colors may be defined if it is possible to define the amount of light with a specific wavelength incident to the human eye and if it is possible to define how the human eye reacts to light with a specific wavelength.

The wavelength of light coming into the human eye from a print is determined by the distribution of wavelengths contained in the light source (or the spectral distribution $L(\lambda)$ of the light source) and the distribution of wavelengths contained in the reflected light from the print (or the spectral reflectance $R(\lambda)$ of the print). How the human eye reacts to light differently depending on wavelength is determined by the color matching functions $x(\lambda)$, $y(\lambda)$, and $z(\lambda)$, where $x(\lambda)$ is the sensitivity of red color component, $y(\lambda)$ is the sensitivity of green color component, and $z(\lambda)$ is the sensitivity of blue color component. Incidentally, each color matching function is customarily expressed by a letter with a small bar above it (which is read as x bar). This small bar is omitted for brevity in this specification. In the case of an ink jet printer like the printer 40 in this embodiment, the spectral reflectance $R(\lambda)$ results from superposition of the spectral reflectance of the exposed part of the printing paper and the spectral reflectance of the ink on the printing paper. The superposition is a linear combination in which the coefficient is the areal ratio. In these expressions, $\lambda$ represents the wavelength of light.

How colors look is calculated in terms of the tristimulus values XYZ which are obtained by integrating with respect to wavelength the product of the spectral distribution $L(\lambda)$ of the light source, the spectral reflectance $R(\lambda)$, and each the color matching functions $x(\lambda)$, $y(\lambda)$, and $z(\lambda)$. In other words, the tristimulus values XYZ are calculated by the following formulas (1).

$$X=\int L(\lambda)R(\lambda)x(\lambda)d\lambda$$

$$Y=\int L(\lambda)R(\lambda)y(\lambda)d\lambda$$

$$Z=\int L(\lambda)R(\lambda)z(\lambda)d\lambda \qquad (1)$$

How the human eye perceives colors is determined by the tristimulus values XYZ. In other words, any color is univocally defined by the combination of the tristimulus values XYZ. Of the factors that determine the tristimulus values, the color matching functions $x(\lambda)$, $y(\lambda)$, and $z(\lambda)$ are the average values of the characteristic properties of the human eye and they cannot be changed artificially. The spectral distribution $L(\lambda)$ changes as the light source changes, as a matter of course. According to the present invention, the dependence on the light source is eliminated by countermeasures against variation in the spectral distribution $L(\lambda)$ of the light source. Of the factors that determine the tristimulus values, the spectral reflectance $R(\lambda)$ is due largely to the spectral reflectance of ink. Therefore, it is possible to alter it artificially by changing the amount and number of inks. According to the present invention, CMYK ink is incorporated with RV ink so that the spectral reflectance $R(\lambda)$ is made desirable.

Figure 10:
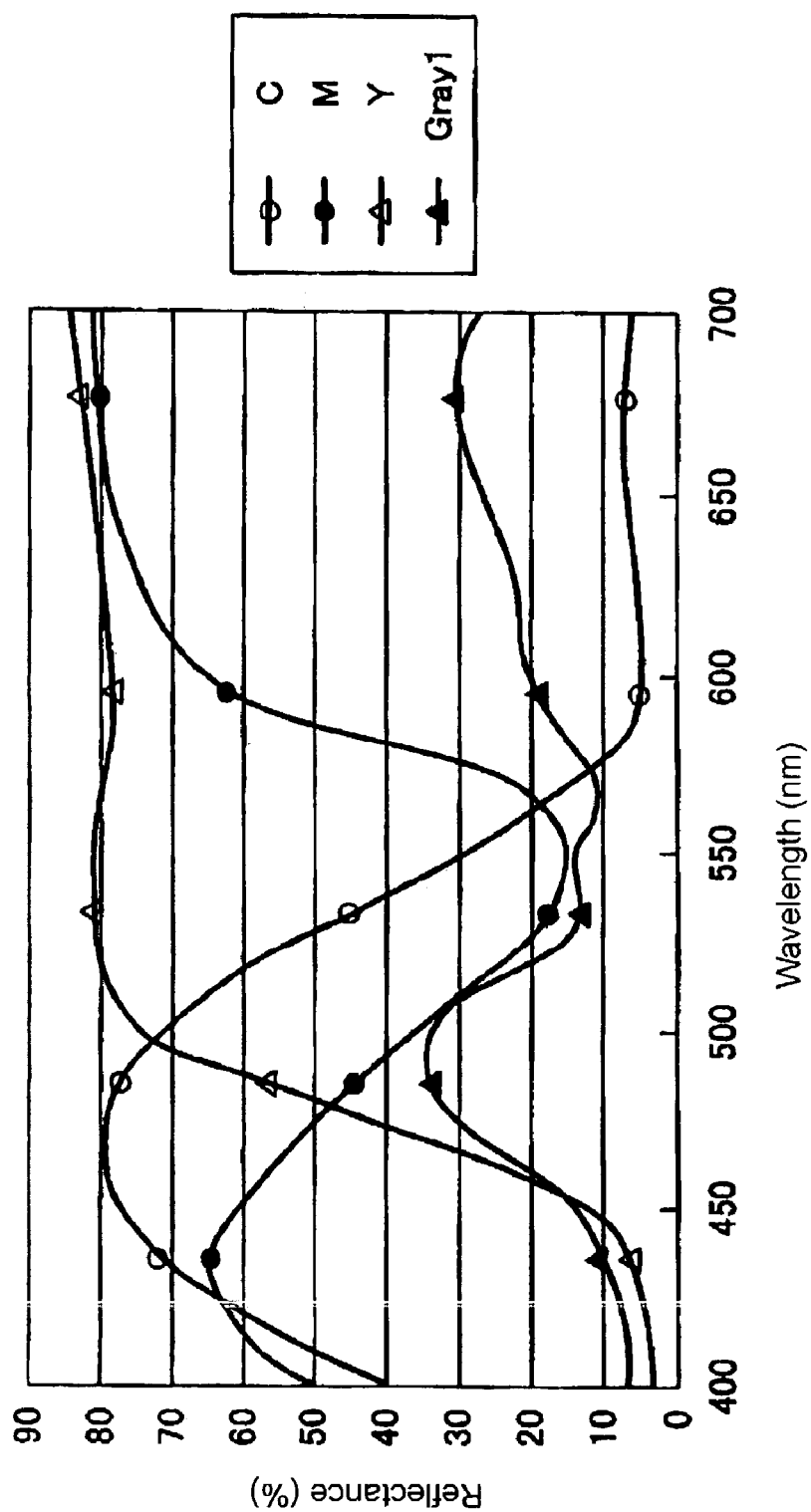
FIG. 10 is a diagram showing the spectral reflectance of CMY inks.

The following is the reason why the addition of RV inks eliminates the dependence on the light source. The point is put on achromatic colors in the following explanation because the effect of the present invention is produced most remarkably in achromatic colors. FIG. 10 shows the spectral reflectance of the CMY inks used in the present invention. In FIG. 10, the ordinate represents the spectral reflectance(%) and the abscissa represents the wavelength (nm). The spectral reflectance of the CMY inks is the same as that in the conventional printer. It is noted that the spectral reflectance of C ink increases as the wavelength increases from 400 nm, remains about 80% as the wavelength increases from 450 nm to 500 nm, decreases as the wavelength increases from 500 nm to 600 nm, and remains below about 10% as the wavelength increases from 600 nm to 700 nm.

The spectral reflectance of Y ink steeply increases as the wavelength increases from 450 nm and remains about 80% as the wavelength increases from 500 nm to 700 nm. The spectral reflectance of M ink increases once as the wavelength increases from 400 nm, decreases as the wavelength increases from 450 nm to 550 nm, increases again as the wavelength increases from 550 nm to 600 nm, and remains about 80% as the wavelength increases from 600 nm. If an achromatic color is to be created with these CMY inks, all of them are delivered to the printing paper.

"Gray1" in FIG. 10 represents the superposed spectral reflectance R(λ) which is produced when all of the CMY inks are delivered to the printing paper. The spectral reflectance R(λ) of the achromatic color should ideally be flat over the entire wavelengths. In other words, Gray1 in FIG. 10 should ideally be a straight line parallel to the abscissa. However, it is difficult to realize this ideal by combination of CMY inks because the spectral reflectance is a result of linear combination of the area of ink droplets and the area of exposed print paper multiplied by the respective spectral reflectance. In FIG. 10, the spectral reflectance has a peak at a wavelength of 500 nm and a minimum value at a wavelength of 400 nm. This up-and-down behavior is the cause of the ink color looking reddish under a different light source.

This is not the case with the present invention, in which the addition of RV inks makes flat the spectral reflectance R(λ) of the achromatic color. In other words, the peak in the spectral reflectance results from the fact that any of the spectral reflectance of CMY inks has a spectral reflectance at wavelengths of about 500 nm. The decrease in the spectral reflectance results from that fact that the spectral reflectance of CM inks is intermediate and the spectral reflectance of Y ink is remarkably low at wavelength of about 400 nm. Therefore, it is possible to reduce the waviness of the spectral reflectance R(λ) of the achromatic color by adding ink whose spectral reflectance is low at wavelengths of about 500 nm and somewhat high at wavelengths of about 400 nm.

Figure 11:
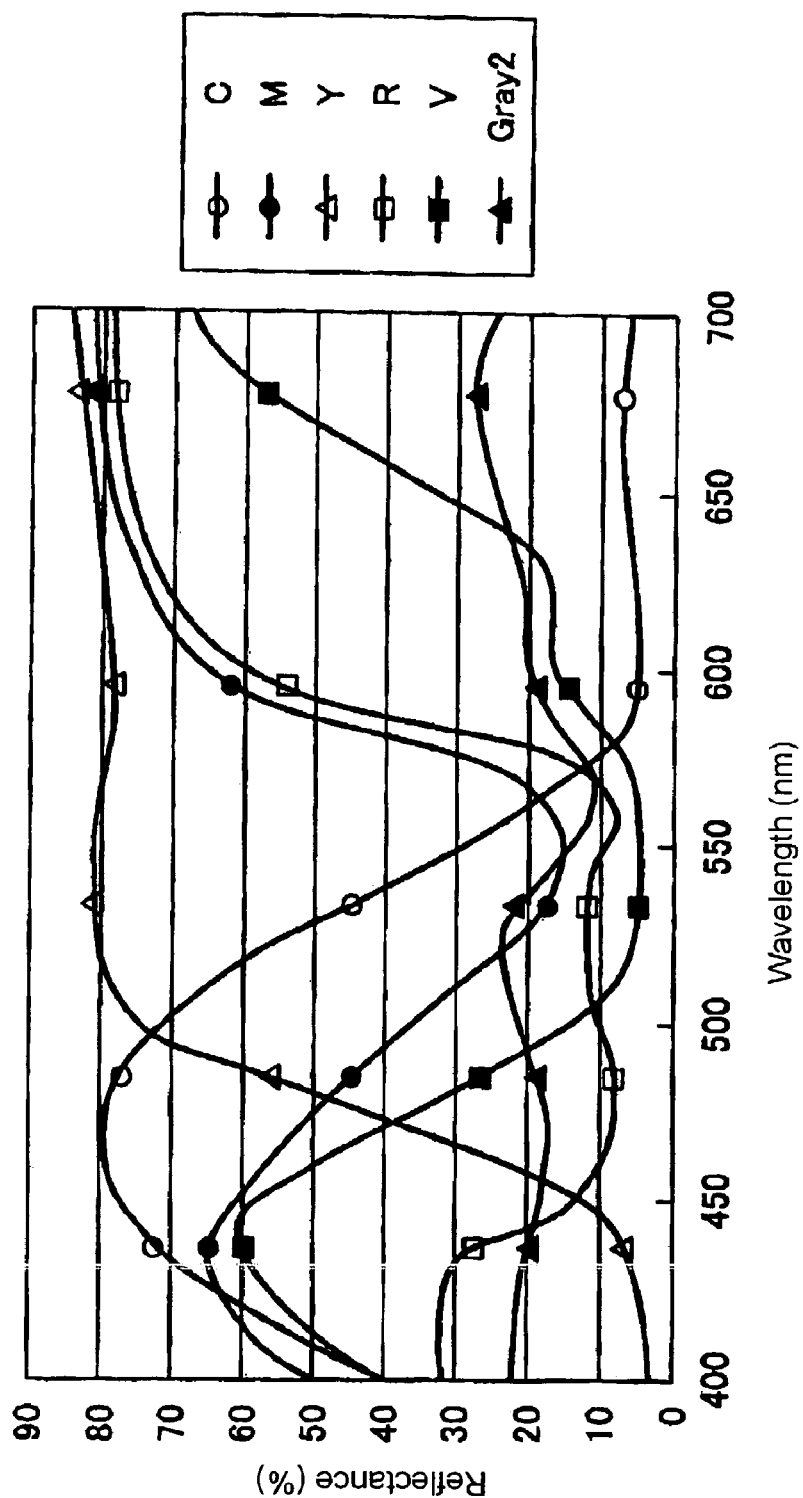
FIG. 11 is a diagram showing the spectral reflectance of CMYRV inks.

In FIG. 11, the spectral reflectance in FIG. 10 is reproduced, with the spectral reflectance of RV inks superposed thereon. The spectral reflectance of R ink is about 30% at wavelength of 400 nm; it decreases as the wavelength increases, remains at about 10% until the wavelength increases to about 550 nm, increases once at wavelength of 550 nm, and remains about 80% at wavelengths beyond 620 nm. The spectral reflectance of V ink increases once as the wavelength increases from 400 nm, decreases as the wavelength increases from 450 nm to 500 nm, remains constant as the wavelength increases from 500 nm to 600 nm, and increases again as the wavelength increases from 600 nm.

In other words, both RV inks have a low spectral reflectance (below 20%) at wavelength of about 500 nm and an intermediate spectral reflectance (30-40%) at wavelength of about 400 nm. Therefore, when combined with CMY inks, RV inks increase the spectral reflectance at wavelength of 400 nm and decrease the spectral reflectance at wavelength of 500 nm. Thus, as represented by Gray2 in FIG. 11, the spectral reflectance R(λ) resulting from the combination of CMYKRV inks becomes flat over the entire range of wavelength as compared with that of Gray1 given above.

Figure 12:
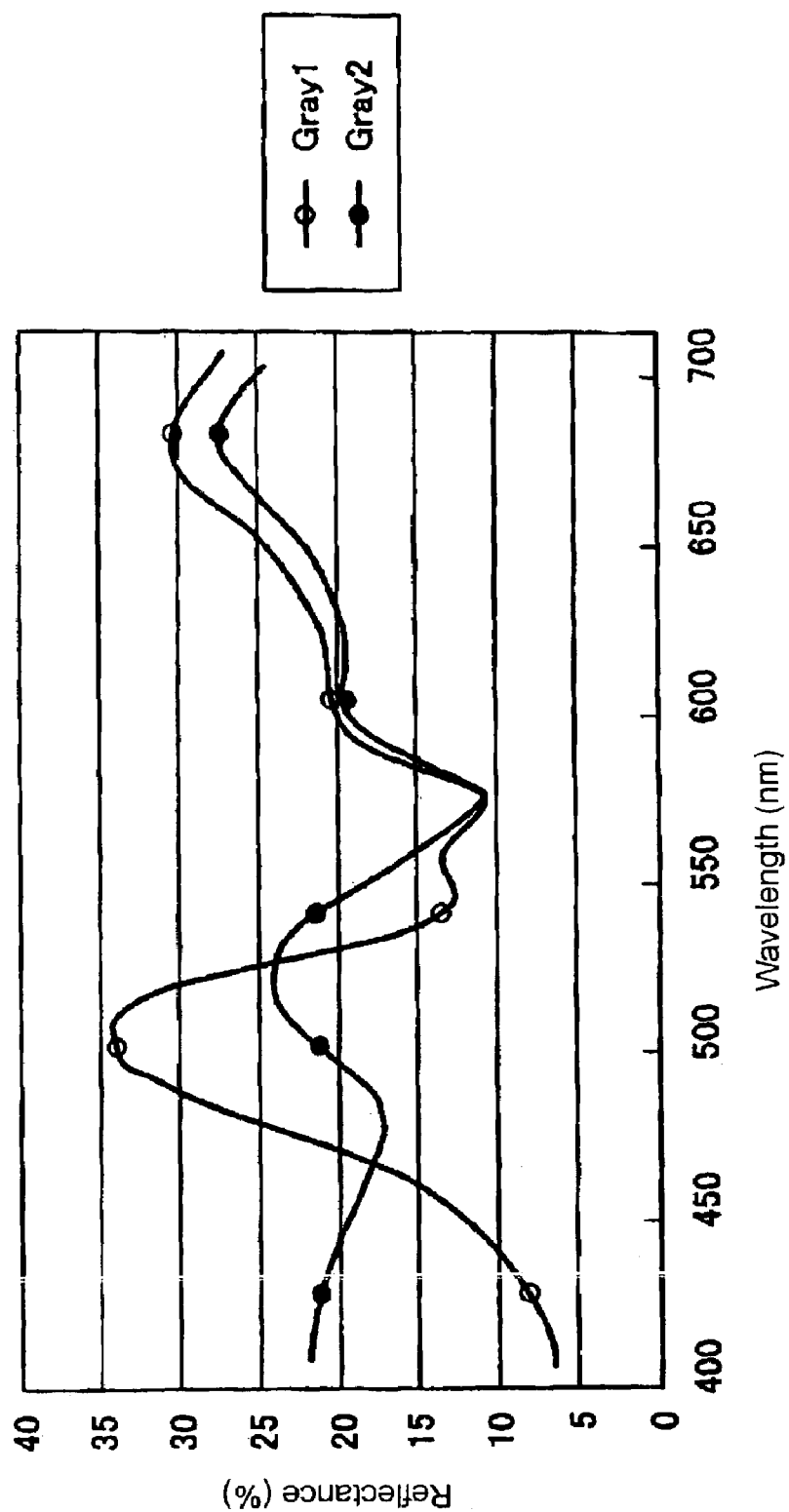
FIG. 12 is a diagram showing the comparison of the spectral reflectance $R(\lambda)$ of achromatic color.

FIG. 12 shows Gray1 and Gray 2 superposed one over the other. The former is the spectral reflectance of R(λ) resulting from the combination of CMY inks, and the latter is the spectral reflectance of R(λ) resulting from the combination of CMYKRV inks. (They were shown in FIGS. 10 and 11.) It is noted that the spectral reflectance R(λ) of Gray1 is much lower at a wavelength of 400 nm than at other wavelengths and has a large peak at a wavelength of 500 nm, whereas the spectral reflectance R(λ) of Gray2 is flat (without peaks and troughs) over the entire range of wavelengths. Incidentally, in FIGS. 10 to 12, it is assumed that the combination of CMY inks and RV inks produces an achromatic color with a certain value of lightness. The spectral reflectance R(λ) of achromatic colors varies at other values of lightness depending on the amount of RV inks added to CMY inks. It is possible to control the spectral reflectance R(λ) more flexibly by adding RV inks to CMY inks, and hence the resulting spectral reflectance is close to an ideal one.

Figure 13:
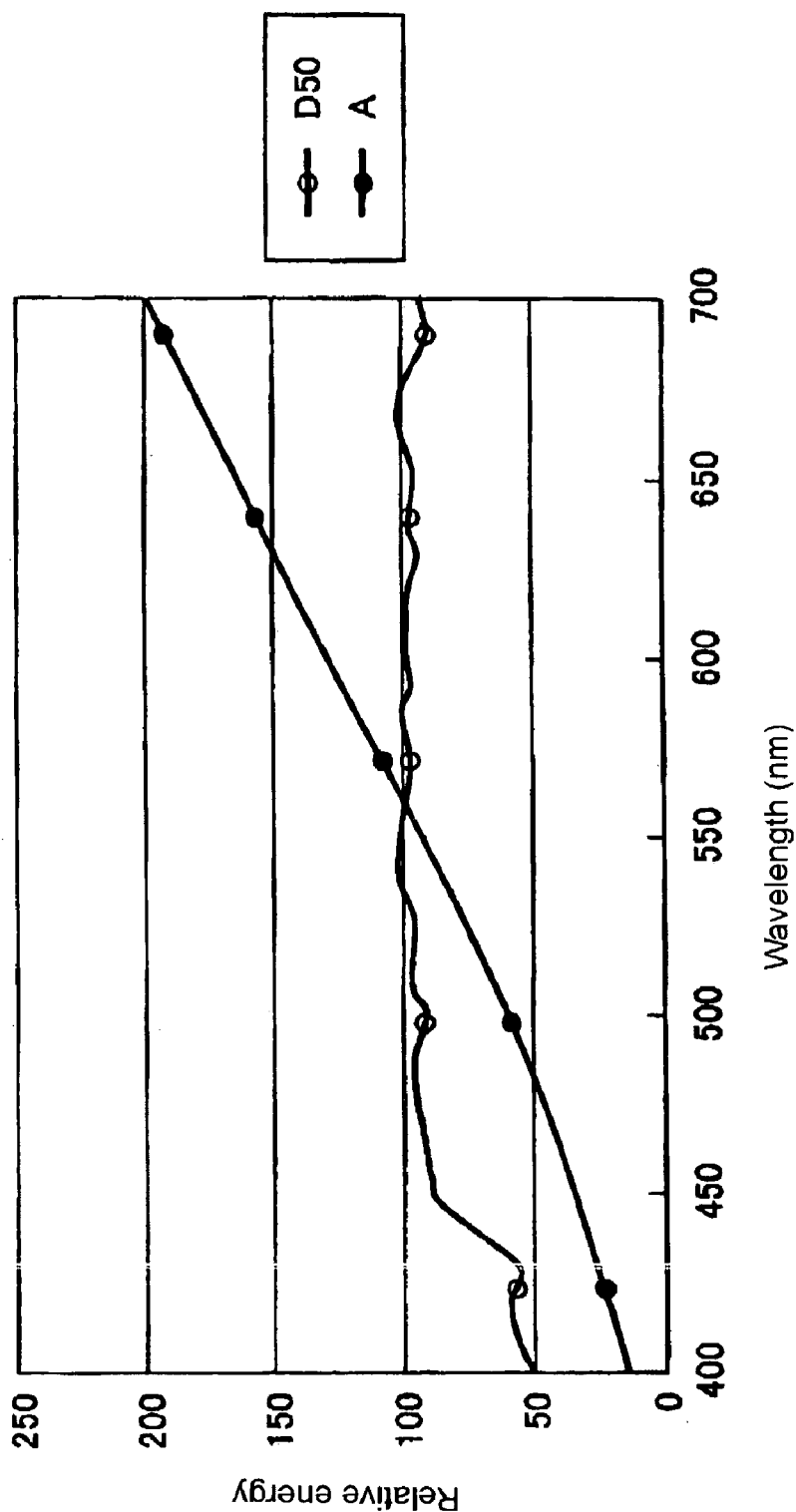
FIG. 13 is a diagram showing the spectral distribution of $D_{50}$ light source and A light source.

As mentioned above, the dependence on the light source disappears when the spectral reflectance R(λ) is flat over the entire range of wavelengths, that is, the chromatic color takes on no color even though the light source is changed. The reason for this is explained in the following. FIG. 13 shows the spectral distribution of $D_{50}$ light source and A light source provided by CIE (International Commission on Illumination). The ordinate represents the relative energy of light and the abscissa represents the wavelength of light. As shown in FIG. 13, the $D_{50}$ light source has spectral distribution which is almost constant over the entire visible region of wavelengths. It is a so-called white light. The A light source produces a reddish light, with its energy almost linearly increasing in proportion to wavelengths.

As mentioned above, any color perceived by the human eye is represented by the tristimulus values XYZ, which depend on the spectral reflectance R(λ) of the above-mentioned achromatic color and the spectral distribution of the light source. The contribution on Gray1 and Gray2 from the $D_{50}$ light source is almost constant over the entire range of wavelengths. Therefore, both look like an achromatic color. However, the A light source increases in energy in proportion to wavelengths; therefore, contribution from such light depends on its wavelength.

When the A light source is multiplied by Gray1 and Gray2, the contribution to each is the same; however, since Gray1 is originally higher than Gray2 in the ratio of change of the spectral reflectance R(λ) and is far from being the state in which the spectral reflectance is constant, the case in which the spectral distribution of the A light source is multiplied by Gray1 gets away more from the achromatic color. For example, in the example shown in FIG. 12, the spectral reflectance of Gray1 below wavelengths 450 nm is small and the spectral reflectance of Gray2 is large; therefore, when the spectral distribution is multiplied, in the combination of CMY ink (Gray1), the contribution below wavelength 450 nm is almost null, and it does not look achromatic.

Figure 14:
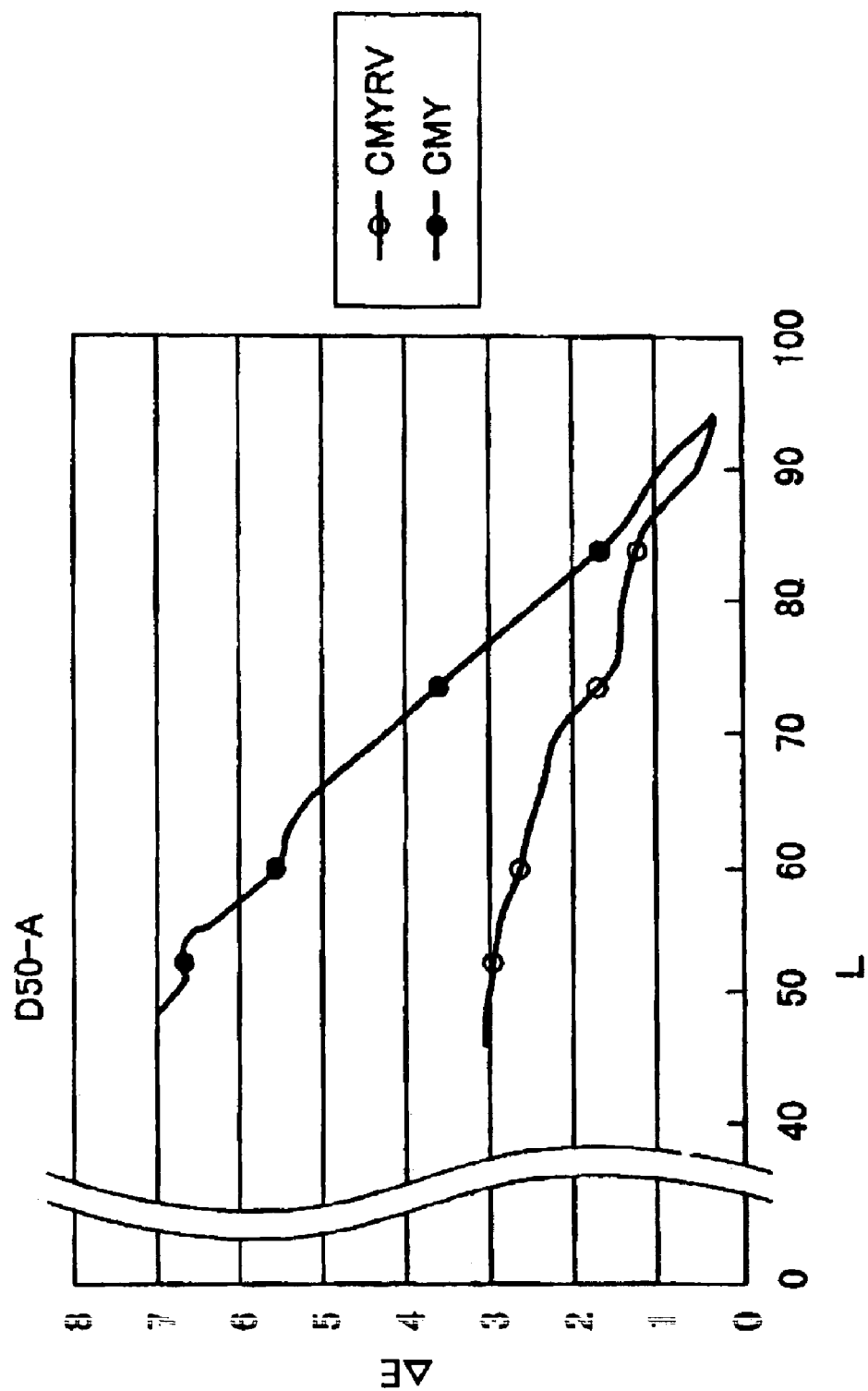
FIG. 14 is a diagram showing the color difference that varies depending on the light source.

FIG. 14 shows the difference between the color value in the $D_{50}$ light source and the color value in the A light source for each of the achromatic colors due to combination of the CMY inks and combination of the CMYRV inks. As mentioned above, colors are represented in terms of tristimulus values XYZ. In FIG. 14, the tristimulus values are converted into color values in the Lab space which is the absolute color space. The color difference ΔE (distance in the Lab space) in each light source is plotted on the ordinate, and the abscissa represents the lightness L. In this embodiment, a black (K) ink is used in the case where the lightness (L) is lower than 40 and hence comparison is made for colors (free of K ink) whose lightness is higher than 45. As shown in FIG. 14, the color difference ΔE due to difference in the light source is such that the way of combinations of CMY inks is larger than the way of combinations of CMYRV inks. Therefore, the combination of CMYRV inks gives less remarkable color change due to change in the light source. Thus, the dependence on the light source is eliminated.

(6) The Second Embodiment

Figure 15:
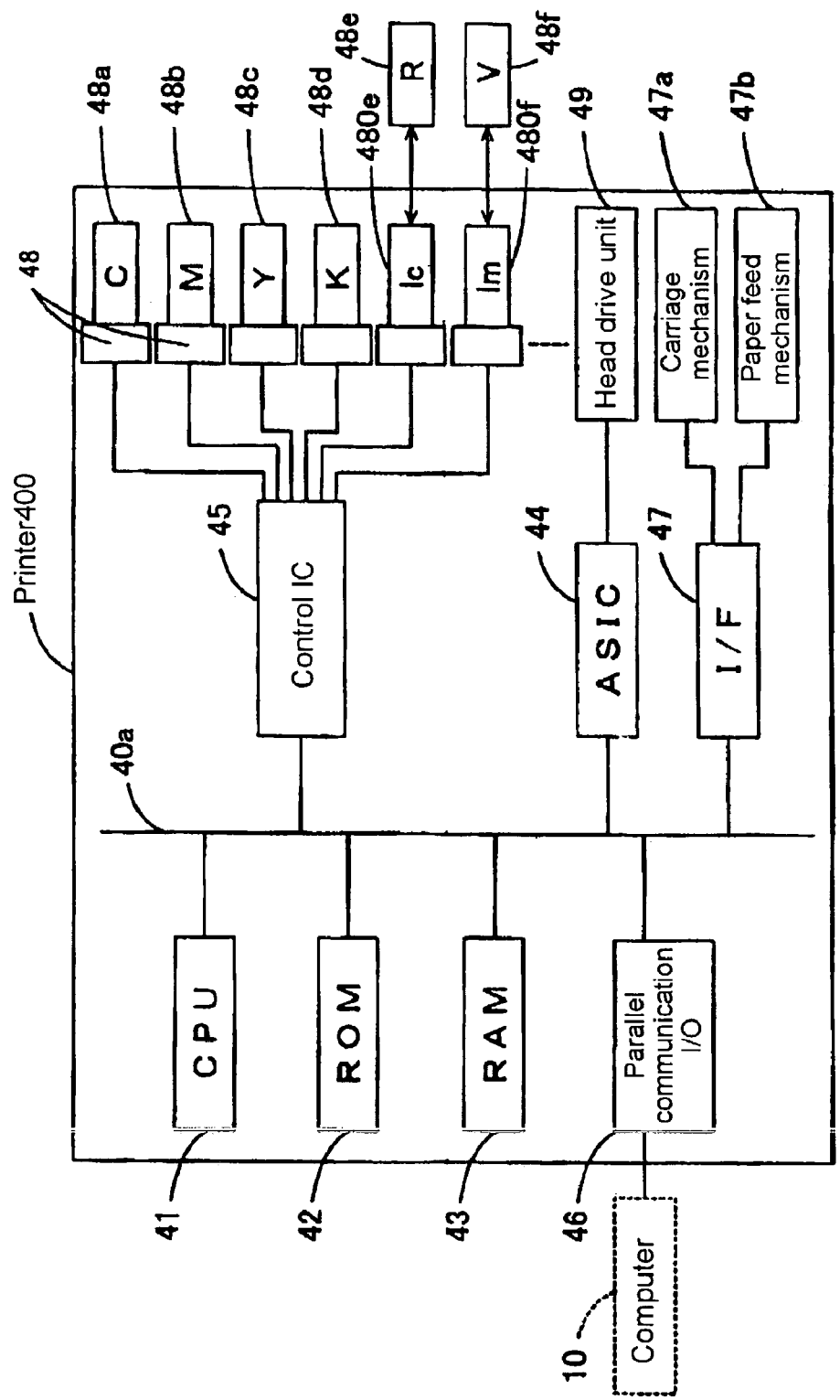
FIG. 15 is a schematic diagram showing the hardware structure of the printer.

In the above-mentioned embodiment, the printer 40 is provided, by default, with the secondary cartridge filled with RV ink. Of course, the printer may be constructed such that the user selects the RV ink at need. FIG. 15 is a schematic diagram showing the hardware structure of the printer 400 which is constructed such that the user selects the RV ink at need. In FIG. 15, the same parts in the printer shown in FIG. 2 are indicated by the same codes. This printer may use the software constructed in the same way as PRTDRV 21 shown in FIG. 3. The software in this embodiment may be modified such that the LUT 15c (not shown) which specifies correspondence between CMYKlclm data and sRGB data is previously stored in HDD 15 and the user selects it on the screen showing the properties of printing.

To be concrete, as shown in FIG. 15, the printer 400 can mount, by default, ink cartridges 48a-48d, 480e, and 480f filled with CMYKlclm inks respectively. These ink cartridges 48a-48d, 480e, and 480f are mountable and demountable on and from the cartridge holders 48. The ink cartridge 480e for lc ink and the ink cartridge 480f for lm ink can be replaced by the ink cartridge 48e for R ink and the ink cartridge 48f for V ink.

Figure 16:
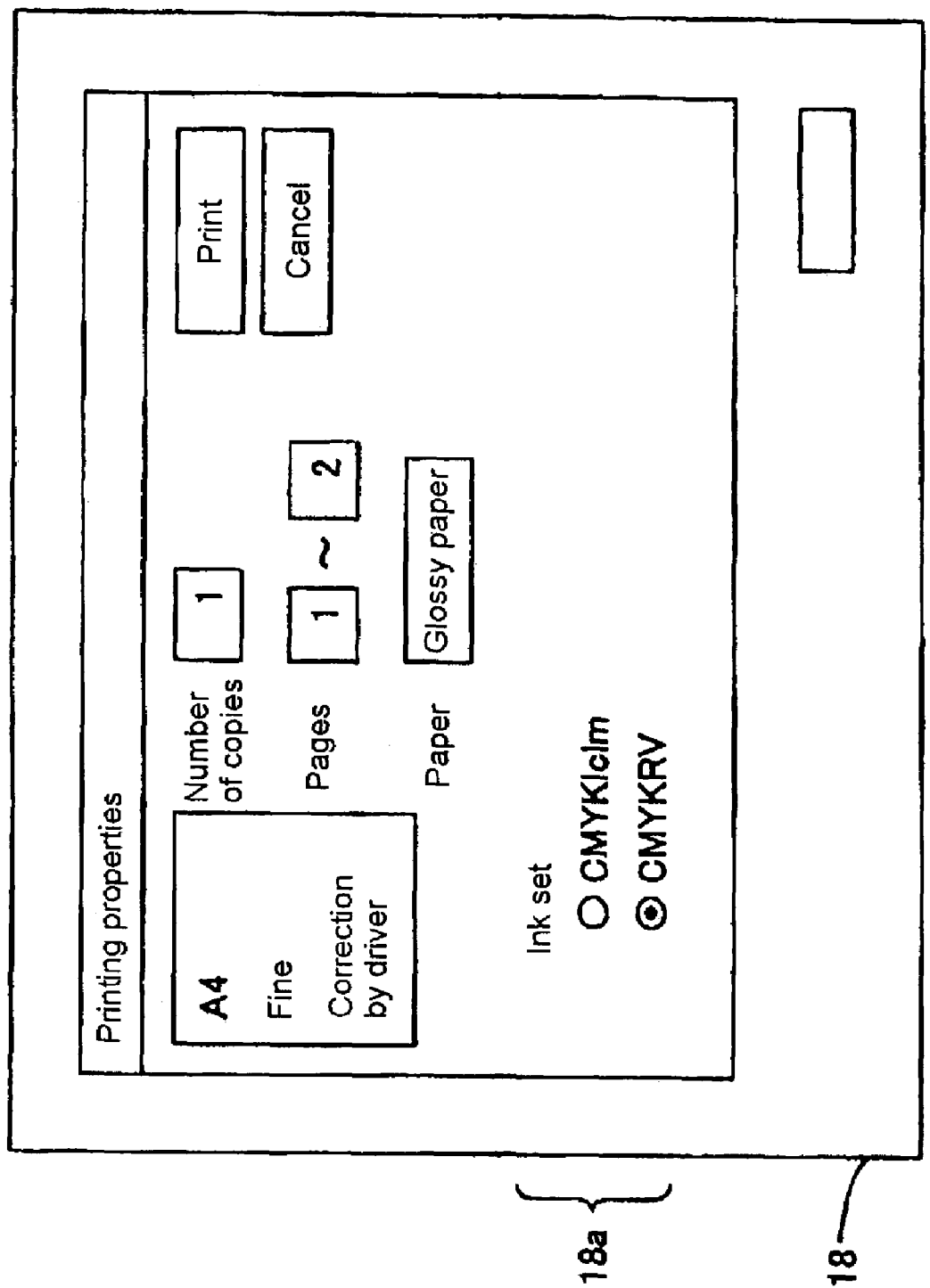
FIG. 16 is a diagram showing the screen for printing properties.

FIG. 16 is a diagram showing the screen for printing properties which appears when print execution is instructed by the APL 25. In other words, when print instruction is given by the APL 25, the PRTDRV 21 is activated and the PRTDRV 21 sends data to the display DRV 23 and shows UI to enter information necessary for printing. This UI is the screen showing the printing properties. The PRTDRV 21 accepts through the input machine DRV 22 various input operations which the user performs using the keyboard 31 etc. while watching this screen.

The screen for printing properties shown in FIG. 16 permits the user to enter various parameters to be specified at the time of printing. The screen has various boxes into which the number of copies and the number of pages are entered and various buttons to instruct print execution and print cancellation. In addition, the screen has radio buttons 18a for ink set selection (at the lower part of the properties screen), so that the user can switch them by using the pointer of the mouse 32. The ink selection radio buttons 18a correspond to the ink set (in colors) to be used; therefore, the user can specify CMYKlclm ink or CMYKRV ink as the ink to be used.

What has been selected by the ink set selection radio buttons 18a is sent to the color conversion module 21b, which selects the LUT that corresponds to the selection. In other words, when CMYKRV is selected by the ink set selection radio buttons 18a, the LUT 15b is selected, and when CMYKlclm is selected by the ink set selection radio buttons 18a, the LUT 15c (not shown) is selected. Thus, the user can perform printing with either CMYKlclm inks or CMYKRV inks according to circumstances.

The printer that uses CMYKlclm inks by default as in this embodiment is a general-purpose one, and the present invention is realized simply by adding the LUT to the general-purpose structure and slightly modifying the software. Incidentally, it is not essential in this embodiment that the color conversion module 21b acquires the setting in the screen for print properties. For example, modification may be made such that information in the cartridge memory mounted on the ink cartridge is read out and the color of ink held in the ink cartridge 48e is judged so that LUT is selected automatically.

Also, in the case where lclm inks and RV inks are delivered through the same passage, as in this embodiment, it is desirable to perform cleaning carefully at the time of switching by means of the cleaning mechanism (not shown) in the ink supply passage attached to the printer 400. In addition, the switching of ink colors is not essential in order to make it possible to use both CMYKlclm inks and CMYKRV inks.

Modification may be made such that the number of cartridge holders is increased and ink cartridges filled with CMYKlclm inks are mounted.

(7) Other Embodiments

In the above-mentioned embodiments, RV inks are added to CMY inks (or CMYK inks); however, R and V inks are not always essential. In other words, if an achromatic color is to be made by combination of CMY inks, it is only necessary to eliminate the trouble that the spectral reflectance gives a peak at wavelengths of about 500 nm; therefore, it is possible to adopt other inks than RV inks, such as orange ink and blue violet ink which have the spectral reflectance in the vicinity of 500 nm. Of course, it is possible to add R, V, orange, and blue violet inks individually. In the above-mentioned embodiments, a certain color is added to CMY (or CMYK) inks as the base colors. It is also possible to add an ink of another hue to three base colors which are different from CMY inks.

As mentioned above, the present invention uses at least three chromatic colors and additional three chromatic colors different in hue from said three chromatic colors. The ink to be added to the three chromatic colors is one which has the spectral reflectance to reduce waviness in the spectral reflectance of the almost achromatic color produced by combination of these three colors. Therefore, it is possible to create, by combination of inks, a color which has the almost uniform spectral reflectance over the entire region of wavelengths, and it is possible to obtain the printing result which changes little in color depending on the light source.

What is claimed is:

1. A printer of the type having an ink cartridge mount to carry a plurality of ink cartridges thereon and a printing mechanism for printing on printing paper with inks received from said ink cartridges, wherein said ink cartridge mount is so designed as to carry at least three ink cartridges filled respectively with three chromatic color inks having three chromatic colors and a secondary ink cartridge filled with a chromatic color ink which has a lower spectral reflectance than each of the three chromatic colors in a region of wavelengths in which a spectral reflectance produced by a gray color comprised of a combination of the three chromatic colors has a highest portion in a range of visible wavelengths.

2. The printer as defined in claim 1, wherein the ink held in each of the ink cartridges is a pigment-based ink.

3. The printer as defined in claim 1, wherein the ink cartridge mount is capable of mounting the main ink cartridges filled with at least three color inks, which are cyan ink, magenta ink, and yellow ink, and the secondary ink cartridges filled with either or both of red ink and violet ink.

4. The printer as defined in claim 3, wherein the spectral reflectance of the cyan ink increases as the wavelength increases from 400 nm, remains at about 80% at the wavelengths ranging from 450 nm to 500 nm, decreases as the wavelength increases from 500 nm to 600 nm, and remains below 10% at the wavelengths ranging from 600 nm to 700 nm; the spectral reflectance of the yellow ink rapidly increases as the wavelength increases from about 450 nm, and remains at about 80% at the wavelengths ranging from 500 nm to 700 nm; the spectral reflectance of the magenta ink increases once as the wavelength increases from 400 nm, decreases as the wavelength increases from 450 nm to 550 nm, increases as the wavelength increases from 550 nm to 600 nm, and remains at about 80% as the wavelength increases from 600 nm; the spectral reflectance of the red ink is about 30% at the wavelength of 400 nm, decreases as the wavelength increases, remains at about 10% as the wavelength increases to about 550 nm, increases once as the wavelength increases from 550 nm, and remains at about 80% as the wavelength increases to about 620 nm; and the spectral reflectance of the violet ink increases once as the wavelength increases from 400 nm, decreases as the wavelength increases from 450 nm to 500 nm, remains constant as the wavelength increases from 500 nm to 600 nm, and increases as the wavelength increases from 600 nm.

5. The printer as defined in claim 1, wherein the ink cartridge mount is capable of mounting ink cartridges for at least six colors, at least one of which is interchangeable with the secondary ink cartridge.

6. The printer as defined in claim 1, which comprises an image data acquisition unit which acquires image data representing dot-matrix pixels, a color conversion table storing unit which stores the color conversion table to specify the correspondence between said image data and the ink color image data defining the colors of pixels by the chromatic colors of at least said three color inks and the color held in the secondary ink cartridge, a color conversion unit which converts said image data into said ink color image data by referencing said color conversion table, a printing data generating unit which generates printing data to execute printing with colors specified by the ink color image data which has undergone color conversion, and a print mechanism control unit which controls said print mechanism in response to said printing data.

7. The printer as defined in claim 6, wherein the color conversion table is prepared by color separation to replace at least said three chromatic colors with the color of the ink held in said secondary ink cartridge.

8. The printer as defined in claim 7, wherein the color separation process replaces magenta ink and yellow ink with red ink.

9. The printer as defined in claim 7, wherein the color separation process replaces magenta ink and cyan ink with violet ink.

10. A computer readable medium having stored thereon a print control program to control printing with a printer having an ink cartridge mount capable of mounting three main ink cartridges filled respectively with three chromatic color inks having three chromatic colors and a secondary ink cartridge filled with a chromatic color ink which has a higher spectral reflectance than each of the three chromatic colors in a region of wavelengths in which a spectral reflectance produced by a gray color comprised of a combination of the three chromatic colors has a lowest portion in a range of visible wavelengths, and a printing mechanism for printing on printing paper with inks received from said ink cartridges, wherein said print control program causes a computer to realize an image data acquisition function to acquire image data consisting of pixels arranged in a dot matrix, a color conversion table storing function to store in a prescribed storage area the color conversion table which specifies the correspondence between said image data and the ink color image data which specifies the color of pixels with said three chromatic colors and the color of the ink held in the secondary ink cartridge, a color conversion function to convert said image data into said ink color image data by referencing said color conversion table, a printing data generating function to generate printing data to perform printing with colors specified by the ink color image data which has undergone said color conversion, and a printing data output function to output said printing data so as to control the driving of said printing mechanism.

11. A printing method for a printer having an ink cartridge mount to carry a plurality of ink cartridges thereon and a printing mechanism for printing on printing paper with inks received from said ink cartridges, said printing method comprising:
providing an ink cartridge mount designed to carry at least three ink cartridges filled respectively with three chromatic color inks having three chromatic colors and a secondary ink cartridge filled with a chromatic color ink which has a lower spectral reflectance than each of the three chromatic colors in a region of wavelengths in which a spectral reflectance produced by a gray color comprised of a combination of the three chromatic colors has a highest portion in a range of visible wavelengths; and
printing on printing paper with inks received from said ink cartridges.

12. A printer of the type having an ink cartridge mount to carry a plurality of ink cartridges thereon and a printing mechanism for printing on printing paper with inks received from said ink cartridges, wherein said ink cartridge mount is so designed as to carry at least three ink cartridges filled respectively with three chromatic color inks having three chromatic colors and a secondary ink cartridge filled with a chromatic color ink which has a higher spectral reflectance than each of the three chromatic colors in a region of wavelengths in which a spectral reflectance produced by a gray color comprised of a combination of the three chromatic colors has a lowest portion in a range of visible wavelengths.

* * * * *